(12) United States Patent
Angell et al.

(10) Patent No.: US 9,092,808 B2
(45) Date of Patent: Jul. 28, 2015

(54) PREFERRED CUSTOMER MARKETING DELIVERY BASED ON DYNAMIC DATA FOR A CUSTOMER

(75) Inventors: Robert Lee Angell, Salt Lake City, UT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 2201 days.

(21) Appl. No.: 11/862,294

(22) Filed: Sep. 27, 2007

(65) Prior Publication Data
US 2008/0249868 A1 Oct. 9, 2008

Related U.S. Application Data

(63) Continuation-in-part of application No. 11/695,983, filed on Apr. 3, 2007.

(51) Int. Cl.
G06Q 30/00 (2012.01)
G06Q 30/06 (2012.01)
G06Q 30/02 (2012.01)

(52) U.S. Cl.
CPC .............. *G06Q 30/06* (2013.01); *G06Q 30/02* (2013.01); *G06Q 30/0255* (2013.01); *G06Q 30/0264* (2013.01); *G06Q 30/0271* (2013.01)

(58) Field of Classification Search
USPC .......................................................... 705/14
See application file for complete search history.

(56) References Cited

U.S. PATENT DOCUMENTS

| | | |
|---|---|---|
| 4,929,819 A | 5/1990 | Collins, Jr. |
| 5,091,780 A | 2/1992 | Pomerleau |
| 5,231,483 A | 7/1993 | Sieber et al. |
| 5,233,513 A | 8/1993 | Doyle |
| 5,511,006 A | 4/1996 | Tachibana et al. |
| 5,729,697 A | 3/1998 | Schkolnick et al. |
| 5,799,292 A | 8/1998 | Hekmatpour |
| 5,855,008 A * | 12/1998 | Goldhaber et al. .......... 705/14.1 |

(Continued)

FOREIGN PATENT DOCUMENTS

| | | |
|---|---|---|
| GB | 2247592 A | 3/1992 |
| JP | 2003187335 A | 7/2003 |

(Continued)

OTHER PUBLICATIONS

U.S. Appl. No. 11/695,983, filed Apr. 3, 2007, Angell et al.

(Continued)

*Primary Examiner* — Alvin L Brown
(74) *Attorney, Agent, or Firm* — Yee & Associates, P.C.; John R. Pivnichny

(57) ABSTRACT

A computer implemented method, apparatus, and computer usable program product for automatically determining a marketing status for a customer. In one embodiment, detection data is received from a set of detectors associated with the retail facility. The detection data is processed to form dynamic data. The dynamic data is analyzed using a set of data models to identify marketing initiation factors. In response to the marketing initiation factors indicating initiation of marketing to the customer, a customized marketing message is generated for the customer and dynamically transmitted to a display device associated with the customer. The customized marketing message is displayed to the customer in real-time as the customer is shopping at the retail facility.

2 Claims, 9 Drawing Sheets

(56) References Cited

U.S. PATENT DOCUMENTS

| | | |
|---|---|---|
| 5,898,475 A | 4/1999 | Martin |
| 5,918,211 A | 6/1999 | Sloane |
| 5,933,811 A | 8/1999 | Angles et al. |
| 5,956,081 A | 9/1999 | Katz et al. |
| 6,009,410 A | 12/1999 | LeMole et al. |
| 6,028,626 A | 2/2000 | Aviv |
| 6,032,127 A | 2/2000 | Schkolnick et al. |
| 6,052,676 A | 4/2000 | Hekmatpour |
| 6,055,513 A | 4/2000 | Katz et al. |
| 6,101,486 A | 8/2000 | Roberts et al. |
| 6,115,709 A | 9/2000 | Gilmour et al. |
| 6,118,887 A | 9/2000 | Cosatto et al. |
| 6,128,663 A | 10/2000 | Thomas |
| 6,167,441 A | 12/2000 | Himmel |
| 6,191,692 B1 | 2/2001 | Stoltz et al. |
| 6,226,784 B1 | 5/2001 | Holmes et al. |
| 6,249,768 B1 | 6/2001 | Tulskie, Jr. et al. |
| 6,266,649 B1 | 7/2001 | Linden et al. |
| 6,334,109 B1 | 12/2001 | Kanevsky et al. |
| 6,366,298 B1 | 4/2002 | Haitsuka |
| 6,393,163 B1 | 5/2002 | Burt et al. |
| 6,400,276 B1 | 6/2002 | Clark |
| 6,507,366 B1 | 1/2003 | Lee |
| 6,560,639 B1 | 5/2003 | Dan et al. |
| 6,571,216 B1 | 5/2003 | Garg et al. |
| 6,571,279 B1 | 5/2003 | Herz et al. |
| 6,584,445 B2 | 6/2003 | Papageorge |
| 6,593,852 B2 | 7/2003 | Gutta et al. |
| 6,647,257 B2 | 11/2003 | Owensby |
| 6,647,269 B2 | 11/2003 | Hendrey et al. |
| 6,659,344 B2 | 12/2003 | Otto et al. |
| 6,738,532 B1 | 5/2004 | Oldroyd |
| 6,754,389 B1 | 6/2004 | Dimitrova et al. |
| 6,829,475 B1 | 12/2004 | Lee et al. |
| 6,856,249 B2 | 2/2005 | Strubbe et al. |
| 6,879,960 B2 | 4/2005 | Nascenzi et al. |
| 6,976,000 B1 | 12/2005 | Manganaris et al. |
| 7,010,501 B1 | 3/2006 | Roslak et al. |
| 7,028,018 B2 | 4/2006 | Kocher |
| 7,044,369 B2 | 5/2006 | Gantz |
| 7,080,778 B1 | 7/2006 | Kressin et al. |
| 7,168,618 B2 | 1/2007 | Schwartz |
| 7,195,157 B2 | 3/2007 | Swartz et al. |
| 7,200,266 B2 | 4/2007 | Ozer et al. |
| 7,224,852 B2 | 5/2007 | Lipton et al. |
| 7,310,442 B2 | 12/2007 | Monachino et al. |
| 7,357,316 B2 | 4/2008 | Heckel et al. |
| 7,370,004 B1 | 5/2008 | Patel et al. |
| 7,394,916 B2 | 7/2008 | Brodsky et al. |
| 7,472,080 B2 | 12/2008 | Goel |
| 7,480,395 B2 | 1/2009 | Parunak et al. |
| 7,548,874 B2 | 6/2009 | Kanevsky et al. |
| 7,606,728 B2 | 10/2009 | Sorensen |
| 7,630,986 B1 | 12/2009 | Herz et al. |
| 7,673,797 B2 | 3/2010 | Edwards |
| 7,687,744 B2 | 3/2010 | Walter et al. |
| 7,788,170 B2 | 8/2010 | Lilly et al. |
| 7,801,762 B2 | 9/2010 | Walker et al. |
| 7,826,923 B2 | 11/2010 | Walker et al. |
| 7,865,371 B2 | 1/2011 | Shen |
| 7,908,233 B2 | 3/2011 | Angell et al. |
| 7,908,237 B2 | 3/2011 | Angell et al. |
| 7,925,549 B2 | 4/2011 | Looney et al. |
| 7,933,797 B2 | 4/2011 | Sorensen |
| 7,975,917 B2 | 7/2011 | Clark et al. |
| 8,195,499 B2 | 6/2012 | Angell et al. |
| 2002/0091568 A1 | 7/2002 | Kraft et al. |
| 2002/0107741 A1 | 8/2002 | Stern et al. |
| 2002/0111852 A1 | 8/2002 | Levine |
| 2002/0116265 A1 | 8/2002 | Hernandez |
| 2002/0121547 A1 | 9/2002 | Wieth et al. |
| 2002/0143613 A1 | 10/2002 | Hong et al. |
| 2002/0161651 A1 | 10/2002 | Godsey et al. |
| 2002/0171736 A1 | 11/2002 | Gutta et al. |
| 2002/0178013 A1 | 11/2002 | Hoffman et al. |
| 2003/0107650 A1 | 6/2003 | Colmenarez et al. |
| 2003/0212580 A1 | 11/2003 | Shen |
| 2003/0217024 A1 | 11/2003 | Kocher |
| 2003/0228035 A1 | 12/2003 | Parunak et al. |
| 2003/0231769 A1 | 12/2003 | Bolle et al. |
| 2004/0078236 A1 | 4/2004 | Stoodley et al. |
| 2004/0111454 A1 | 6/2004 | Sorensen |
| 2004/0113933 A1 | 6/2004 | Guler |
| 2004/0120581 A1 | 6/2004 | Ozer et al. |
| 2004/0125125 A1 | 7/2004 | Levy |
| 2004/0143505 A1 | 7/2004 | Kovach |
| 2004/0151374 A1 | 8/2004 | Lipton et al. |
| 2004/0156530 A1 | 8/2004 | Brodsky et al. |
| 2004/0225627 A1 | 11/2004 | Botros et al. |
| 2005/0002561 A1 | 1/2005 | Monachino et al. |
| 2005/0012817 A1 | 1/2005 | Hampapur et al. |
| 2005/0185392 A1 | 8/2005 | Walter et al. |
| 2005/0187819 A1 | 8/2005 | Johnson |
| 2006/0032914 A1 | 2/2006 | Brewster et al. |
| 2006/0032915 A1 | 2/2006 | Schwartz |
| 2006/0074769 A1 | 4/2006 | Looney et al. |
| 2006/0089918 A1 | 4/2006 | Avanzi et al. |
| 2006/0116927 A1 | 6/2006 | Miller, III et al. |
| 2006/0200378 A1 | 9/2006 | Sorensen |
| 2006/0218057 A1 | 9/2006 | Fitzpatrick et al. |
| 2006/0251541 A1 | 11/2006 | Santandrea |
| 2007/0008408 A1 | 1/2007 | Zehavi |
| 2007/0050828 A1 | 3/2007 | Renzi et al. |
| 2007/0052536 A1 | 3/2007 | Hawkes et al. |
| 2007/0069014 A1 | 3/2007 | Heckel et al. |
| 2007/0078759 A1 | 4/2007 | Lilly et al. |
| 2007/0100649 A1 | 5/2007 | Walker et al. |
| 2007/0112713 A1 | 5/2007 | Seaman et al. |
| 2007/0244778 A1 | 10/2007 | Bailard |
| 2007/0282665 A1 | 12/2007 | Buehler et al. |
| 2007/0291118 A1 | 12/2007 | Shu et al. |
| 2007/0294706 A1 | 12/2007 | Neuhauser et al. |
| 2008/0004951 A1* | 1/2008 | Huang et al. .................. 705/14 |
| 2008/0010114 A1 | 1/2008 | Head |
| 2008/0033752 A1 | 2/2008 | Rodgers |
| 2008/0059282 A1 | 3/2008 | Vallier et al. |
| 2008/0059297 A1 | 3/2008 | Vallier et al. |
| 2008/0077493 A1 | 3/2008 | Geffert |
| 2008/0089107 A1 | 4/2008 | Lee et al. |
| 2008/0114633 A1 | 5/2008 | Wolf et al. |
| 2008/0147511 A1 | 6/2008 | Edwards |
| 2008/0215391 A1 | 9/2008 | Dowling et al. |
| 2008/0243626 A1* | 10/2008 | Stawar et al. .................. 705/23 |
| 2008/0249793 A1 | 10/2008 | Angell et al. |
| 2008/0249835 A1 | 10/2008 | Angell et al. |
| 2008/0249836 A1 | 10/2008 | Angell et al. |
| 2008/0249837 A1 | 10/2008 | Angell et al. |
| 2008/0249838 A1 | 10/2008 | Angell et al. |
| 2008/0249851 A1 | 10/2008 | Angell et al. |
| 2008/0249856 A1 | 10/2008 | Angell et al. |
| 2008/0249857 A1 | 10/2008 | Angell et al. |
| 2008/0249858 A1 | 10/2008 | Angell et al. |
| 2008/0249859 A1 | 10/2008 | Angell et al. |
| 2008/0249864 A1 | 10/2008 | Angell et al. |
| 2008/0249865 A1 | 10/2008 | Angell et al. |
| 2008/0249866 A1 | 10/2008 | Angell et al. |
| 2008/0249867 A1 | 10/2008 | Angell et al. |
| 2008/0249869 A1 | 10/2008 | Angell et al. |
| 2008/0249870 A1 | 10/2008 | Angell et al. |
| 2008/0270172 A1 | 10/2008 | Luff et al. |
| 2008/0270220 A1 | 10/2008 | Ramer et al. |
| 2008/0270222 A1 | 10/2008 | Goel |
| 2009/0002155 A1 | 1/2009 | Ma et al. |
| 2009/0005650 A1 | 1/2009 | Angell et al. |
| 2009/0006125 A1 | 1/2009 | Angell et al. |
| 2009/0006286 A1 | 1/2009 | Angell et al. |
| 2009/0006295 A1 | 1/2009 | Angell et al. |
| 2009/0037193 A1 | 2/2009 | Vempati et al. |
| 2009/0083121 A1 | 3/2009 | Angell et al. |
| 2009/0083122 A1 | 3/2009 | Angell et al. |
| 2009/0089107 A1 | 4/2009 | Angell et al. |
| 2009/0198625 A1 | 8/2009 | Walker et al. |
| 2009/0322492 A1 | 12/2009 | Hannah et al. |
| 2010/0023372 A1* | 1/2010 | Gonzalez .................. 705/10 |

(56) References Cited

U.S. PATENT DOCUMENTS

| | | | |
|---|---|---|---|
| 2010/0026802 | A1 | 2/2010 | Titus et al. |
| 2010/0032482 | A1 | 2/2010 | Clark et al. |
| 2010/0169229 | A1 | 7/2010 | Lee |
| 2010/0180029 | A1 | 7/2010 | Fourman |
| 2011/0004511 | A1 | 1/2011 | Reich |
| 2012/0328263 | A1 | 12/2012 | Barton et al. |
| 2013/0096966 | A1 | 4/2013 | Barnes |

FOREIGN PATENT DOCUMENTS

| | | |
|---|---|---|
| JP | 2003263544 A | 9/2003 |
| WO | 0217235 A2 | 2/2002 |

OTHER PUBLICATIONS

U.S. Appl. No. 11/861,520, filed Sep. 26, 2007, Angell et al.
U.S. Appl. No. 11/861,590, filed Sep. 26, 2007, Angell et al.
U.S. Appl. No. 11/861,729, filed Sep. 26, 2007, Angell et al.
U.S. Appl. No. 11/862,279, filed Sep. 27, 2007, Angell et al.
U.S. Appl. No. 11/862,299, filed Sep. 27, 2007, Angell et al.
U.S. Appl. No. 11/862,306, filed Sep. 27, 2007, Angell et al.
U.S. Appl. No. 11/862,320, filed Sep. 27, 2007, Angell et al.
U.S. Appl. No. 11/862,323, filed Sep. 27, 2007, Angell et al.
U.S. Appl. No. 11/743,982, filed May 3, 2007, Angell et al.
U.S. Appl. No. 11/744,024, filed May 3, 2007, Angell et al.
U.S. Appl. No. 11/769,409, filed Jun. 27, 2007, Angell et al.
U.S. Appl. No. 11/756,198, filed May 31, 2007, Angell et al.
U.S. Appl. No. 11/771,252, filed Jun. 29, 2007, Angell et al.
U.S. Appl. No. 11/764,524, filed Jun. 18, 2007, Angell et al.
U.S. Appl. No. 11/861,528, filed Sep. 26, 2007, Angell et al.
U.S. Appl. No. 11/862,374, filed Sep. 27, 2007, Angell et al.
U.S. Appl. No. 11/771,887, filed Jun. 29, 2007, Angell et al.
U.S. Appl. No. 11/771,912, filed Jun. 29, 2007, Angell et al.
U.S. Appl. No. 11/861,966, filed Sep. 26, 2007, Angell et al.
U.S. Appl. No. 11/861,975, filed Sep. 26, 2007, Angell et al.
USPTO office action for U.S. Appl. No. 11/695,983 dated Mar. 25, 2010.
USPTO office action for U.S. Appl. No. 11/861,520 dated May 6, 2010.
USPTO office action for U.S. Appl. No. 11/743,982 dated Mar. 24, 2010.
USPTO office action for U.S. Appl. No. 11/769,409 dated Apr. 14, 2010.
USPTO office action for U.S. Appl. No. 11/756,198 dated Apr. 22, 2010.
USPTO office action for U.S. Appl. No. 11/771,252 dated May 5, 2010.
USPTO office action for U.S. Appl. No. 11/764,524 dated Apr. 15, 2010.
USPTO office action for U.S. Appl. No. 11/861,528 dated May 13, 2010.
USPTO office action for U.S. Appl. No. 11/771,887 dated Mar. 8, 2010.
USPTO office action for U.S. Appl. No. 11/771,912 dated Apr. 8, 2010.
Wu et al. "Vehicle Sound Signature Recognition by Frequency Vector Principal Component Analysis", IEEE Instrumentation and Measurement Technology Conference, May 18-20, 1998, pp. 429-434.
Kosba, et al, "Personalized Hypermedia Presentation Techniques for Improving Online Customer Relationships", The Knowledge Engineering Review, Vo 16:2, 2001, pp. 111-155.
Ng, Cheuk-Fan, Satisfying shoppers psychological needs: From public market to cyber-mall, 2002, Journal of Environmental Psychology, 23 (2003) pp. 439-455.
USPTO office action for U.S. Appl. No. 11/861,590 dated Jun. 15, 2010.
USPTO office action for U.S. Appl. No. 11/861,729 dated Jun. 15, 2010.
USPTO office action for U.S. Appl. No. 11/862,306 dated Jun. 24, 2010.
USPTO office action for U.S. Appl. No. 11/862,320 dated Aug. 5, 2010.
USPTO office action for U.S. Appl. No. 11/743,982 dated Aug. 19, 2010.
USPTO final office action for U.S. Appl. No. 11/756,198 dated Aug. 31, 2010.
USPTO office action for U.S. Appl. No. 11/862,374 dated Aug. 19, 2010.
USPTO final office action for U.S. Appl. No. 11/769,409 dated Aug. 31, 2010.
USPTO final office action for U.S. Appl. No. 11/771,912 dated Jul. 21, 2010.
USPTO final office action for U.S. Appl. No. 11/861,528 dated Sep. 9, 2010.
USPTO Notice of allowance for U.S. Appl. No. 11/771,887 dated Sep. 2, 2010.
Knuchel et al., "A Learning based approach for anonymous Recommendation", Proceedings of the 8th IEEE International Conference on E-Commerce Technology and the 3rd IEEE International Conference on Enterprise Computing, E-Commerce and E-Services, 2006, pp. 1-8.
"CRM Marketing Initiatives," In: The CRM Handbook: A Business Guide to Customer Relationship Management, Dyche (Ed.), Addison-Wesley Professional, Aug. 9, 2001, excerpt from http://academic.safaribooksonline.com/print?xmlid=0-201-73062-6/ch02lev1sec3, downloaded Jan. 23, 2012, 13 pages.
"Infogrames Brings Sense of Touch to Web Sites with Immersion Technology," Immersion Corporation, May 22, 2000, 2 pages.
"Software Models," Excel Software, http://web.archive.org/web/19990203054425/excelsoftware.com/models.hml, Oct. 1996, 11 pages.
"Software Prototyping," University of Houston, Sep. 22, 2008, 32 pages.
Anupam et al., "Personalizing the Web Using Site Descriptions," Proceedings of the 10th International Workshop on Database and Expert Systems Applications, Florence, Italy, Sep. 1-3, 1999, 7 pages.
Bestavros, "Banking Industry Walks 'Tightrope' in Personalization of Web Services," Bank Systems & Technology, 37(1):54, Jan. 2000.
Collins et al., "A System for Video Surveillance and Monitoring," Technical Report CMU-RI-TR-00-12, Robotics Institute, Carnegie Mellon University, May 2000, 69 pages.
Greiffenhagen et al., "Design, Analysis, and Engineering of Video Monitoring Systems: An Approach and a Case Study," Proceedings of the IEEE, 89(10):1498-1517, Oct. 2001.
Hampapur et al., "Smart Video Surveillance—Exploring the Concept of Multiscale Spatiotemporal Tracking," IEEE Signal Processing Magazine, 22(2):38-51, Mar. 2005.
Kittle, "Pilfered Profits; Both Retailers and Consumers Take a Hit from Shoplifting," Telegraph—Herald, Dubuque, Iowa, Apr. 28, 2008, http://proquest.umi.com/pdqweb?index=2&did=634769861&SrchMode=2&sid=5&Fmt=3, accessed Jul. 29, 2010, 5 pages.
Kuhn, "Affinity Architecture: Towards a Model for Planning and Designing Comprehensively Personalised Web Applications," Journal of AGASI, pp. 60-63, Jul. 1999.
Lipton et al., "Critical Asset Protection, Perimeter Monitoring, and Threat Detection Using Automated Video Surveillance," Proceedings of the 36th Annual International Carnahan Conference on Security Technology, Dec. 2002, pp. 1-11.
Mitchell, "Computerizing Video Surveillance Techniques," IBM Technical Disclosure Bulletin, n5 10-92, Oct. 1, 1992, 1 page.
Sandler, "Tavern Camera Mandate Proposed: Milwaukee Alderman Hopes to Log Evidence of Misbehavior, Crime," Knight Ridder Tribune Business News, Washington, D.C., Oct. 4, 2006, http://proquest.umi.com/pdqweb?index=2&did=1139882851&SrchMode=2&sid=1&Fmt=, accessed Aug. 12, 2011, 2 pages.
Office Action regarding U.S. Appl. No. 09/761,121, dated Mar. 3, 2004, 9 pages.
Final Office Action regarding U.S. Appl. No. 09/761,121, dated Nov. 24, 2004, 6 pages.
Office Action regarding U.S. Appl. No. 09/761,121, dated May 24, 2005, 8 pages.

(56) References Cited

OTHER PUBLICATIONS

Final Office Action regarding U.S. Appl. No. 09/761,121, dated Nov. 16, 2005, 8 pages.
Office Action regarding U.S. Appl. No. 09/761,121, dated Jun. 10, 2010, 10 pages.
Final Office Action regarding U.S. Appl. No. 09/761,121, dated Oct. 25, 2010, 8 pages.
Notice of Allowance regarding U.S. Appl. No. 10/918,521, dated Sep. 27, 2006, 11 pages.
Office Action regarding U.S. Appl. No. 11/455,251, dated Dec. 10, 2010, 7 pages.
Final Office Action regarding U.S. Appl. No. 11/455,251, dated Apr. 27, 2011, 5 pages.
Office Action regarding U.S. Appl. No. 11/744,024, dated Sep. 28, 2010, 37 pages.
Final Office Action regarding U.S. Appl. No. 11/764,524, dated Aug. 19, 2010, 25 pages.
Final Office Action regarding U.S. Appl. No. 11/743,982, dated Jan. 31, 2011, 14 pages.
Final Office Action regarding U.S. Appl. No. 11/862,299, dated Aug. 18, 2011, 25 pages.
Final Office Action regarding U.S. Appl. No. 11/862,306, dated Dec. 3, 2010, 26 pages.
Office Action regarding U.S. Appl. No. 11/862,323, dated Sep. 3, 2010, 26 pages.
Final Office Action regarding U.S. Appl. No. 11/862,323, dated Aug. 19, 2011, 21 pages.
Final Office Action regarding U.S. Appl. No. 11/862,374, dated Jan. 28, 2011, 34 pages.
Final Office Action regarding U.S. Appl. No. 11/862,374, dated May 12, 2011, 31 pages.
Office Action regarding U.S. Appl. No. 11/862,374, dated Aug. 31, 2011, 37 pages.
Final Office Action regarding U.S. Appl. No. 11/862,374, dated Jan. 4, 2012, 36 pages.
Final Office Action regarding U.S. Appl. No. 11/771,252, dated Oct. 15, 2010, 20 pages.
Office Action regarding U.S. Appl. No. 11/771,884, dated Sep. 23, 2010, 15 pages.
Final Office Action regarding U.S. Appl. No. 11/771,884, dated Mar. 18, 2011, 13 pages.
Office Action regarding U.S. Appl. No. 11/771,884, dated Aug. 17, 2011, 14 pages.
Final Office Action regarding U.S. Appl. No. 11/771,884, dated Feb. 28, 2012, 17 pages.
Notice of Allowance regarding U.S. Appl. No. 11/771,912, dated Nov. 5, 2010, 12 pages.
Final Office Action regarding U.S. Appl. No. 11/695,983, dated Jul. 7, 2010, 23 pages.
Final Office Action regarding U.S. Appl. No. 11/861,520, dated Oct. 28, 2010, 26 pages.
Final Office Action regarding U.S. Appl. No. 11/861,590, dated Nov. 18, 2010, 31 pages.
Final Office Action regarding U.S. Appl. No. 11/861,966, dated Jul. 22, 2011, 21 pages.
Notice of Allowance regarding U.S. Appl. No. 11/861,975, dated Feb. 3, 2012, 14 pages.
Office Action regarding U.S. Appl. No. 11/774,884, dated Sep. 4, 2012, 16 pages.
Office Action regarding U.S. Appl. No. 11/861,966, dated Oct. 4, 2012, 68 pages.
Final office action regarding U.S. Appl. No. 11/756,198, dated Apr. 24, 2014, 31 pages.
Notice of allowance regarding U.S. Appl. No. 11/771,252, dated Mar. 25, 2014, 21 pages.
Notice of allowance regarding U.S. Appl. No. 11/862,306, dated May 1, 2014, 28 pages.
Final office action regarding U.S. Appl. No. 11/862,323, dated Jun. 3, 2014, 27 pages.
Liraz, "Improving Your Sales Skills," Marketing Management, BizMove Busines Guides, Feb. 1, 2001, 9 pages.
Final Office Action, dated Dec. 30, 2013, regarding U.S. Appl. No. 11/862,279, 16 pages.
Final Office Action, dated Feb. 11, 2014, regarding U.S. Appl. No. 11/862,306, 27 pages.
Office Action, dated Dec. 3, 2013, regarding U.S. Appl. No. 11/862,320, 54 pages.
Office Action, dated Jan. 28, 2014, regarding U.S. Appl. No. 11/862,323, 25 pages.
Final Office Action, dated Jan. 17, 2014, regarding U.S. Appl. No. 11/695,983, 33 pages.
Notice of Allowance, dated Feb. 26, 2014, regarding U.S. Appl. No. 11/862,320, 8 pages.
Final Office Action, dated Feb. 26, 2014, regarding U.S. Appl. No. 11/771,252, 33 pages.
Non-final office action dated Sep. 26, 2013 regarding U.S. Appl. No. 11/756,198, 68 pages.
Non-final office action dated Sep. 18, 2013 regarding U.S. Appl. No. 11/771,252, 70 pages.
Non-final office action dated Jul. 18, 2013 regarding U.S. Appl. No. 11/862,279, 60 pages.
Non-final office action dated Aug. 19, 2013 regarding U.S. Appl. No. 11/862,323, 40 pages.
Non-final office action dated Oct. 15, 2013 regarding U.S. Appl. No. 11/862,306, 67 pages.
Notice of allowance dated Sep. 13, 2013 regarding U.S. Appl. No. 11/769,409, 39 pages.
Non-final office action dated Sep. 17, 2013 regarding U.S. Appl. No. 11/695,983, 76 pages.
Lyall, "What's the Buzz? Rowdy Teenagers Don't Want to Hear It," Barry Journal, The New York Times, Nov. 2005, 1 page.
Non-final office action dated Mar. 15, 2013 regarding U.S. Appl. No. 11/862,323, 23 pages.
Office Action regarding U.S. Appl. No. 11/771,860, dated Sep. 29, 2010, 15 pages.
Final Office Action regarding U.S. Appl. No. 11/771,860, dated Mar. 1, 2011, 13 pages.
Office Action regarding U.S. Appl. No. 11/771,860, dated Nov. 17, 2011, 14 pages.
Final Office Action regarding U.S. Appl. No. 11/771,860, dated May 24, 2012, 14 pages.
Final office action regarding U.S. Appl. No. 11/771,860, dated Mar. 28, 2013, 44 pages.
Office action dated Jun. 12, 2014, regarding U.S. Appl. No. 11/455,251, 7 pages.
Office action dated Oct. 23, 2014, regarding U.S. Appl. No. 11/455,251, 8 pages.
Office action dated Aug. 28, 2014, regarding U.S. Appl. No. 11/862,323, 32 pages.
Final office action dated Nov. 20, 2014, regarding U.S. Appl. No. 11/862,323, 10 pages.
Notice of allowance dated Jan. 6, 2015, regarding U.S. Appl. No. 11/861,729, 38 pages.
Notice of Allowance dated Dec. 11, 2014, regarding U.S. Appl. No. 11/743,982, 41 pages.

\* cited by examiner

PREFERRED CUSTOMER MARKETING DELIVERY BASED ON DYNAMIC DATA FOR A CUSTOMER

CROSS-REFERENCE TO RELATED APPLICATIONS

This application is a continuation-in-part of patent application U.S. Ser. No. 11/695,983, filed Apr. 3, 2007, titled "Method and Apparatus for Providing Customized Digital Media Marketing Content Directly to a Customer", which is incorporated herein by reference.

The present invention is also related to the following applications entitled *Identifying Significant Groupings of Customers for Use in Customizing Digital Media Marketing Content Provided Directly to a Customer*, application Ser. No. 11/744,024, filed May 3, 2007; *Generating Customized Marketing Messages at a Customer Level Using Current Events Data*, application Ser. No. 11/769,409, file Jun. 24, 2007; *Generating Customized Marketing Messages Using Automatically Generated Customer Identification Data*, application Ser. No. 11/756,198, filed May 31, 2007; *Generating Customized Marketing Messages for a Customer Using Dynamic Customer Behavior Data*, application Ser. No. 11/771,252, filed Jun. 29, 2007, *Retail Store Method and System*, Robyn Schwartz, Publication No. US 2006/0032915 A1 (filed Aug. 12, 2004); *Business Offering Content Delivery*, Robyn R. Levine, Publication No. US 2002/0111852 (filed Jan. 16, 2001) all assigned to a common assignee, and all of which are incorporated herein by reference.

BACKGROUND OF THE INVENTION

1. Field of the Invention

The present invention is related generally to an improved data processing system, and in particular to a method and apparatus for processing digital video data. More particularly, the present invention is directed to a computer implemented method, apparatus, and computer usable program product for determining whether to deliver marketing content to a particular customer based on dynamic customer data elements for the particular customer.

2. Description of the Related Art

In the past, merchants frequently had a personal relationship with their customers. The merchant often knew their customers' names, address, marital status, ages of their children, hobbies, place of employment, character, anniversaries, birthdays, likes, dislikes and personal preferences. The merchant was able to use this information to cater to customer needs and push sales of items the customer might be likely to purchase based on the customer's personal situation. The merchant was also able to determine whether a customer was a good customer that should receive special marketing efforts, a credit risk or bad customer that should not receive special marketing offers, or a customer that posed a risk or threat to the store or other customers based on the merchant's personal knowledge of the customer's character, reputation, and criminal history.

However, with the continued growth of large cities, the corresponding disappearance of small, rural towns, and the increasing number of large, impersonal chain stores with multiple employees, the merchants and employees of retail businesses rarely recognize regular customers, and almost never know the customer's name or any other details regarding their customer's personal preferences that might assist the merchant or employee in marketing efforts directed toward a particular customer.

One solution to this problem is directed toward using data mining techniques to gather customer profile data. The customer profile data is used to generate marketing strategies for marketing products to customers. Customer profile data typically includes information provided by the customer in response to a questionnaire or survey, such as the name, address, telephone number, and gender of customers, as well as products preferred by the customer. Demographic data regarding a customer's age, sex, income, career, interests, hobbies, and consumer preferences may also be included in customer profile data.

However, these methods only provide limited and generalized marketing strategies that are directed towards a fairly large segment of the population without taking into account actual customer reactions to product placement in a particular retail store or to other environmental factors that may influence product purchases by customers.

In an attempt to better monitor customers in large retail stores, these stores frequently utilize cameras and other audio and/or video monitoring devices to record customers inside the retail store or in the parking lot. A store detective may watch one or more monitors displaying closed circuit images of customers in various areas inside the store to identify shoplifters. However, these solutions require a human user to review the audio and video recordings. In addition, the video and audio recordings are typically used only for store security.

Thus, current solutions do not utilize all of the potential dynamic customer data elements that may be available for identifying customers that should be marketed to and customers that should not receive marketing content. The data elements currently being utilized to generate marketing strategies only provide approximately seventy-five percent (75%) of the needed customer data.

SUMMARY OF THE INVENTION

The illustrative embodiments provide a computer implemented method, apparatus, and computer usable program product for automatically determining a marketing status for a customer. The process receives data from a set of detectors associated with a retail facility to form detection data for the customer. The detection data is gathered in real-time as the customer is shopping at the retail facility. The process processes the detection data to form dynamic data for the customer. The process analyzes the dynamic data to identify a set of marketing initiation factors. The marketing initiation factors indicating a degree of receptivity of the customer to marketing messages. In response to the set of marketing initiation factors indicate initiation of marketing to the customer, the process generates a customized marketing message for the customer. The process dynamically transmits the customized marketing message to a display device associated with the customer. The customized marketing message is displayed to the customer in real-time as the customer is shopping at the retail facility.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

With reference now to the figures and in particular with reference to FIGS. 1-5, exemplary diagrams of data processing environments are provided in which illustrative embodiments may be implemented. It should be appreciated that FIGS. 1-5 are only exemplary and are not intended to assert or imply any limitation with regard to the environments in which different embodiments may be implemented. Many modifications to the depicted environments may be made.

Figure 1:
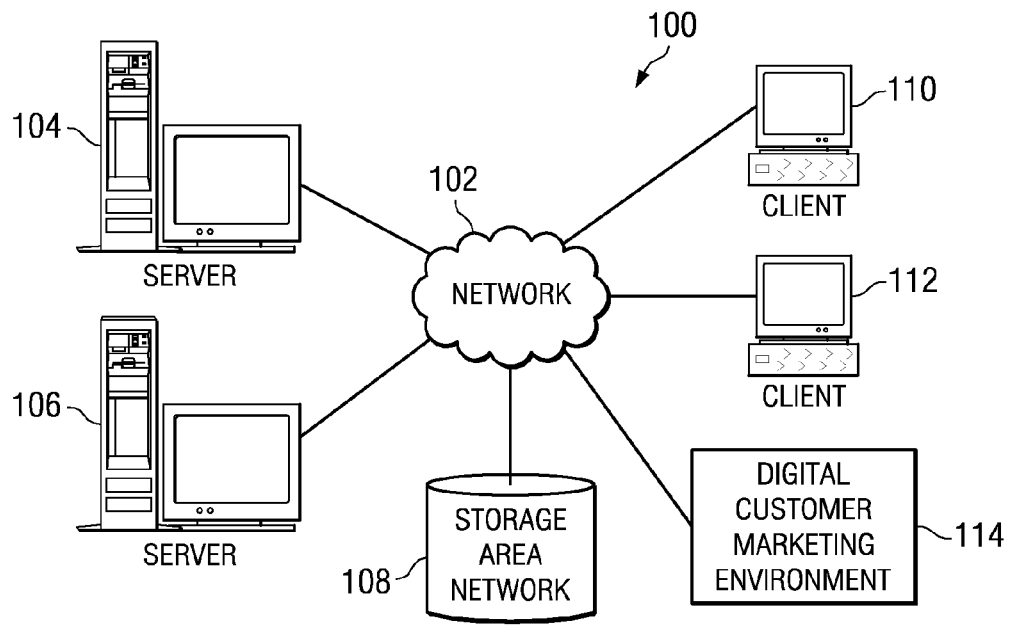
FIG. 1 is a pictorial representation of a network of data processing systems in which illustrative embodiments may be implemented.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage area network (SAN) 108. Storage area network 108 is a network connecting one or more data storage devices to one or more servers, such as servers 104 and 106. A data storage device, may include, but is not limited to, tape libraries, disk array controllers, tape drives, flash memory, a hard disk, and/or any other type of storage device for storing data. Storage area network 108 allows a computing device, such as client 110 to connect to a remote data storage device over a network for block level input/output.

In addition, clients 110 and 112 connect to network 102. These clients 110 and 112 may be, for example, personal computers or network computers. In the depicted example, server 104 provides data, such as boot files, operating system images, and applications to clients 110 and 112. Clients 110 and 112 are clients to server 104 in this example.

Digital customer marketing environment 114 is a retail environment that is connected to network 102. A customer may view, select order, and/or purchase one or more items in digital customer marketing environment 114. Digital customer marketing environment 114 may include one or more facilities, buildings, or other structures for wholly or partially containing items.

The items in digital customer marketing environment 114 may include, but are not limited to, consumables, comestibles, clothing, shoes, toys, cleaning products, household items, machines, any type of manufactured items, entertainment and/or educational materials, as well as entrance or admittance to attend or receive an entertainment or educational activity or event. Items for purchase could also include services, such as, without limitation, dry cleaning services, food delivery services, automobile repair services, vehicle detailing services, personal grooming services, such as manicures and haircuts, cooking demonstrations, or any other services.

Comestibles include solid, liquid, and/or semi-solid food and beverage items. Comestibles may be, but are not limited to, meat products, dairy products, fruits, vegetables, bread, pasta, pre-prepared or ready-to-eat items, as well as unprepared or uncooked food and/or beverage items. For example, a comestible includes, without limitation, a box of cereal, a steak, tea bags, a cup of tea that is ready to drink, popcorn, pizza, candy, or any other edible food or beverage items.

An entertainment or educational activity, event, or service may include, but is not limited to, a sporting event, a music concert, a seminar, a convention, a movie, a ride, a game, a theatrical performance, and/or any other performance, show, or spectacle for entertainment or education of customers. For example, entertainment or educational activity or event could include, without limitation, the purchase of seating at a football game, purchase of a ride on a roller coaster, purchase of a manicure, or purchase of admission to view a film.

Digital customer marketing environment 114 may also includes a parking facility for parking cars, trucks, motorcycles, bicycles, or other vehicles for conveying customers to and from digital customer marketing environment 114. A parking facility may include an open air parking lot, an underground parking garage, an above ground parking garage, an automated parking garage, and/or any other area designated for parking customer vehicles.

For example, digital customer marketing environment 114 may be, but is not limited to, a grocery store, a retail store, a department store, an indoor mall, an outdoor mall, a combination of indoor and outdoor retail areas, a farmer's market, a convention center, a sports arena or stadium, an airport, a bus depot, a train station, a marina, a hotel, fair grounds, an amusement park, a water park, and/or a zoo.

Digital customer marketing environment 114 encompasses a range or area in which marketing messages may be transmitted to a digital display device for presentation to a customer within digital customer marketing environment. Digital multimedia management software is used to manage and/or enable generation, management, transmission, and/or display of marketing messages within digital customer marketing environment. Examples of digital multimedia management software include, but are not limited to, Scala® digital media/digital signage software, EK3® digital media/digital signage software, and/or Allure digital media software.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, without limitation, an intranet, an Ethernet, a local area network (LAN), and/or a wide area network (WAN).

Network data processing system 100 may also include additional data storage devices in addition to or instead of storage area network 108, such as, without limitation, one or more hard disks, compact disks (CD), compact disk rewritable (CD-RW), flash memory, compact disk read-only memory (CD ROM), non-volatile random access memory (NV-RAM), and/or any other type of storage device for storing data.

FIG. 1 is intended as an example, and not as an architectural limitation for different embodiments. Network data processing system 100 may include additional servers, clients, data storage devices, and/or other devices not shown. For example, server 104 may also include devices not depicted in FIG. 1, such as, without limitation, a local data storage device.

In another embodiment, digital customer marketing environment 114 includes one or more servers located on-site at digital customer marketing environment. In this example, network 102 is optional. In other words, if one or more servers and/or data processing systems are located at digital customer marketing environment 114, the illustrative embodiments are capable of being implemented without requiring a network connection to computers located remotely to digital customer marketing environment 114.

A merchant, owner, operator, manager or other employee associated with digital customer marketing environment 114 typically wants to market products or services to customers in the most convenient and efficient manner possible so as to maximize resulting purchases by the customer and increase sales, profits, and/or revenue. Therefore, the aspects of the illustrative embodiments recognize that it is advantageous for the merchant to have as much information as possible describing one or more customers and to anticipate items that the customer may wish to purchase prior to the customer selecting those items for purchase in order to identify the best items to market to the customer and personalize the merchant's marketing strategy to that particular customer.

Therefore, the illustrative embodiments provide a computer implemented method, apparatus, and computer program product for automatically determining a marketing status for a customer. The process receives data from a set of detectors associated with a retail facility to form detection data for the customer. The set of detectors is a set of one or more detectors. The detectors may include one or more detectors located outside the retail facility and/or one or more detectors located inside the retail facility. The detection data is gathered in real-time as the customer is shopping at the retail facility.

The process processes the detection data to form dynamic data for the customer. The process analyzes the dynamic data to identify a set of marketing initiation factors. The set of marketing initiation factors includes one or more marketing initiation factors. The marketing initiation factors indicate a degree of receptivity of the customer to marketing messages.

In response to a determination that the set of marketing initiation factors indicate initiation of marketing to the customer, the process generates a customized marketing message for the customer. The process dynamically transmits the customized marketing message to a display device associated with the customer. The display device displays the customized marketing message to the customer in real-time as the customer is shopping at the retail facility. Real-time refers to something that occurs immediately as or within some period of time needed to achieve the objective of using real-time display of the customized marketing message.

Figure 2:
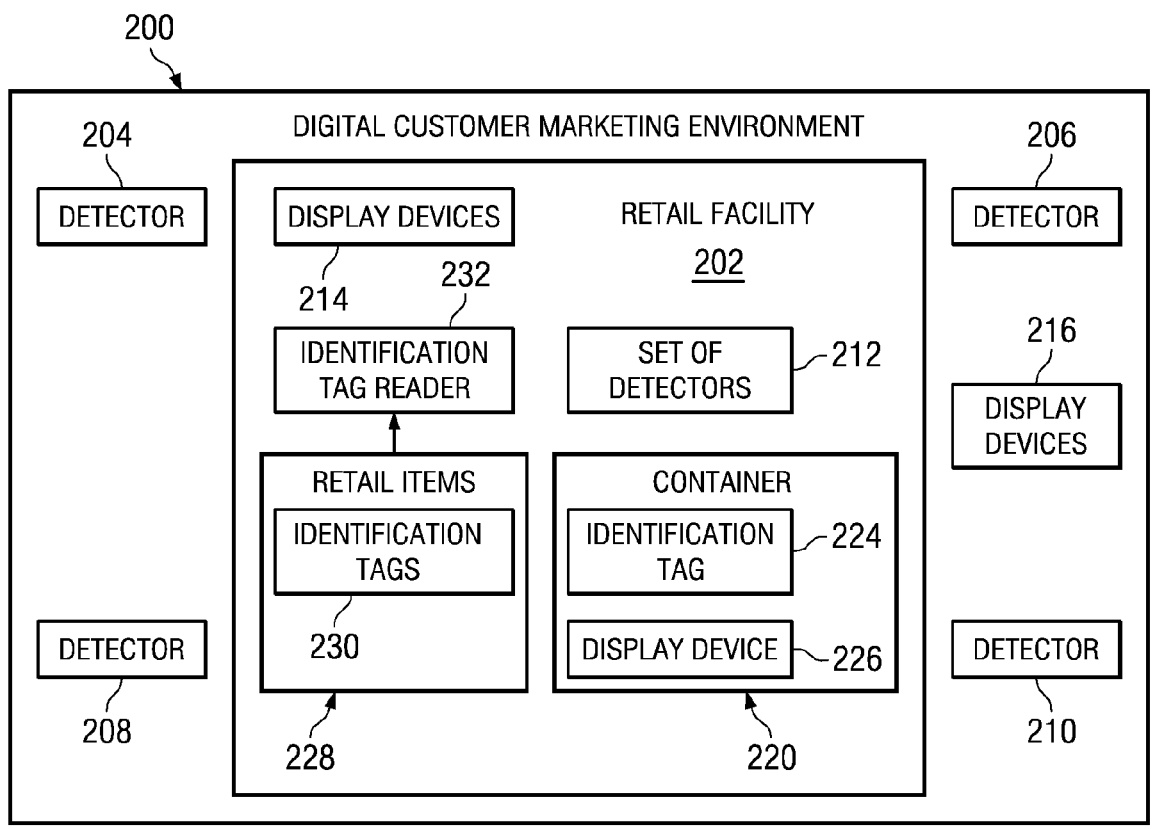
FIG. 2 is a block diagram of a digital customer marketing environment in which illustrative embodiments may be implemented.

FIG. 2 is a block diagram of a digital customer marketing environment in which illustrative embodiments may be implemented. Digital customer marketing environment 200 is a marketing environment, such as digital customer marketing environment 114 in FIG. 1.

Retail facility 202 is a facility for wholly or partially storing, enclosing, or displaying items for marketing, viewing, selection, order, and/or purchase by a customer. For example, retail facility 202 may be, without limitation, a retail store, supermarket, grocery store, a marketplace, a food pavilion, a book store, clothing store, department store, or shopping mall. Retail facility 202 may also include, without limitation, a sports arena, amusement park, water park, convention center, trade center, or any other facility for housing, storing, displaying, offering, providing, and/or selling items. In this example, retail facility 202 is a grocery store or a department store.

Detectors 204-210 are devices for gathering data associated with a set of customers, including, but not limited to, at least one camera, motion sensor device/motion detector, sonar detection device, microphone, sound/audio recording device, audio detection device, a voice recognition system, a heat sensor/thermal sensor, a seismograph, a pressure sensor, a device for detecting odors, scents, and/or fragrances, a radio frequency identification (RFID) tag reader, a global positioning system (GPS) receiver, and/or any other detection device for detecting a presence of a human, animal, object, and/or vehicle located outside of retail facility 202. A set of customers is a set of one or more customers. A vehicle is any type of vehicle for conveying people, animals, or objects to a destination. A vehicle may include, but is not limited to, a car, bus, truck, motorcycle, boat, airplane, or any other type of vehicle.

A heat sensor is any known or available device for detecting heat, such as, but not limited to, a thermal imaging device for generating images showing thermal heat patterns. A heat sensor can detect body heat generated by a human or animal and/or heat generated by a vehicle, such as an automobile or a motorcycle. A set of heat sensors may include one or more heat sensors.

A motion detector may be implemented in any type of known or available motion detector device. A motion detector device may include, but is not limited to, one or more motion detector devices using a photo-sensor, radar or microwave radio detector, or ultrasonic sound waves.

A motion detector using ultrasonic sound waves transmits or emits ultrasonic sound waves. The motion detector detects or measures the ultrasonic sound waves that are reflected back to the motion detector. If a human, animal, or other object moves within the range of the ultrasonic sound waves generated by the motion detector, the motion detector detects a change in the echo of sound waves reflected back. This change in the echo indicates the presence of a human, animal, or other object moving within the range of the motion detector.

In one example, a motion detector device using a radar or microwave radio detector may detect motion by sending out a burst of microwave radio energy and detecting the same microwave radio waves when the radio waves are deflected back to the motion detector. If a human, animal, or other object moves into the range of the microwave radio energy field generated by the motion detector, the amount of energy reflected back to the motion detector is changed. The motion detector identifies this change in reflected energy as an indication of the presence of a human, animal, or other object moving within the motion detectors range.

A motion detector device, using a photo-sensor, detects motion by sending a beam of light across a space into a photo-sensor. The photo-sensor detects when a human, animal, or object breaks or interrupts the beam of light as the human, animal, or object by moving in-between the source of the beam of light and the photo-sensor. These examples of motion detectors are presented for illustrative purposes only. A motion detector in accordance with the illustrative embodiments may include any type of known or available motion detector and is not limited to the motion detectors described herein.

A pressure sensor detector may be, for example, a device for detecting a change in weight or mass associated with the pressure sensor. For example, if one or more pressure sensors are imbedded in a sidewalk, Astroturf, or floor mat, the pressure sensor detects a change in weight or mass when a human customer or animal steps on the pressure sensor. The pressure sensor may also detect when a human customer or animal steps off of the pressure sensor. In another example, one or more pressure sensors are embedded in a parking lot, and the pressure sensors detect a weight and/or mass associated with a vehicle when the vehicle is in contact with the pressure sensor. A vehicle may be in contact with one or more pressure sensors when the vehicle is driving over one or more pressure sensors and/or when a vehicle is parked on top of one or more pressure sensors.

A camera may be any type of known or available camera, including, but not limited to, a video camera for taking moving video images, a digital camera capable of taking still pictures and/or a continuous video stream, a stereo camera, a web camera, and/or any other imaging device capable of capturing a view of whatever appears within the camera's range for remote monitoring, viewing, or recording of a distant or obscured person, object, or area.

Various lenses, filters, and other optical devices such as zoom lenses, wide angle lenses, mirrors, prisms and the like may also be used with an image capture device to assist in capturing the desired view. The image capture device may be fixed in a particular orientation and configuration, or it may, along with any optical devices, be programmable in orientation, light sensitivity level, focus or other parameters. Programming data may be provided via a computing device, such as server 104 in FIG. 1.

A camera may also be a stationary camera and/or non-stationary camera. A non-stationary camera is a camera that is capable of moving and/or rotating along one or more directions, such as up, down, left, right, and/or rotate about an axis of rotation. The camera may also be capable of moving to follow or track a person, animal, or object in motion. In other words, the camera may be capable of moving about an axis of rotation in order to keep a customer, animal, or object within a viewing range of the camera lens. In this example, detectors 204-210 are non-stationary digital video cameras. The camera may be coupled to and/or in communication with the analysis server. In addition, more than one image capture device may be operated simultaneously without departing from the illustrative embodiments of the present invention.

In this example, detectors 204-210 are located at locations along an outer perimeter of digital customer marketing environment 200. However, detectors 204-210 may be located at any position outside retail facility 202 to detect customers before the customers enter retail facility 202 and/or when customers exit retail facility 202.

Detectors 204-210 are connected to an analysis server on a data processing system, such as network data processing system 100 in FIG. 1. The analysis server is illustrated and described in greater detail in FIG. 6 below. The analysis server includes software for analyzing digital images and other data captured by detectors 204-210 to track and/or visually identify retail items, containers, and/or customers outside retail facility 202. Attachment of identifying marks may be part of this visual identification in the illustrative embodiments.

In this example, four detectors, detectors 204-210, are located outside retail facility 202. However, any number of detectors may be used to detect, track, and/or gather dynamic data associated with customers outside retail facility 202. For example, a single detector, as well as two or more detectors may be used outside retail facility 202 for tracking customers entering and/or exiting retail facility 202. The dynamic customer data gathered by the one or more detectors in detectors 204-210 is referred to herein as external data.

Retail facility 202 may also optionally include set of detectors 212 inside retail facility 202. Set of detectors 212 is a set of one or more detectors, such as detectors 204-210. Set of detectors 212 are detectors for gathering dynamic data inside retail facility 202. The dynamic data gathered by set of detectors 212 includes, without limitation, grouping data, identification data, and/or customer behavior data. The dynamic data associated with a customer that is captured by one or more detectors in set of detectors 212 is referred to herein as internal data.

Set of detectors 212 may be located at any location within retail facility 202. In addition, set of detectors 212 may include multiple detectors located at differing locations within retail facility 202. For example, a detector in set of detectors 212 may be located, without limitation, at an entrance to retail facility 202, on one or more shelves in retail facility 202, and/or on one or more doors or doorways in retail facility 202. In one embodiment, set of detectors 212 includes one or more cameras or other image capture devices for tracking and/or identifying items, containers for items, shopping containers, customers, shopping companions of the customer, shopping carts, and/or store employees inside retail facility 202.

Display devices 214 are multimedia devices for displaying marketing messages to customers. Display devices 214 may be any type of display device for presenting a text, graphic, audio, video, and/or any combination of text, graphics, audio, and video to a customer. In this example, display devices 214 are located inside retail facility 202. Display devices 214 may be one or more display devices located within retail facility 202 for use and/or viewing by one or more customers. The images shown on display devices 214 are changed in real time in response to various events such as, without limitation, the time of day, the day of the week, a particular customer approaching the shelves or rack, items already placed inside container 220 by the customer, and dynamic data for the customer.

Display devices 216 located outside retail facility 216 include at least one display device. The display device(s) may be, without limitation, a display screen or a kiosk located in a parking lot, queue line, and/or other area outside of retail facility 202. Display devices 216 outside retail facility 202 may be used in the absence of display devices 214 inside retail facility 202 or in addition to display devices 214.

Display device 226 may be operatively connected to a data processing system via wireless, infrared, radio, or other connection technologies known in the art, for the purpose of transferring data to be displayed on display device 226. The data processing system includes the analysis server for analyzing dynamic external customer data obtained from detectors 204-210 and set of detectors 212, as well as static customer data obtained from one or more databases storing data associated with customers.

Container 220 is a container for holding, carrying, transporting, or moving one or more items. For example, container 220 may be, without limitation, a shopping cart, a shopping bag, a shopping basket, and/or any other type of container for holding items. In this example, container 220 is a shopping cart. In this example in FIG. 2, only one container 220 is depicted. However, any number of containers may be used inside and/or outside retail facility 202 for holding, carrying, transporting, or moving items selected by customers.

Container 220 may also optionally include identification tag 224. Identification tag 224 is a tag for identifying container 220, locating container 220 within digital customer marketing environment 200, either inside or outside retail facility 202, and/or associating container 220 with a particular customer. For example, identification tag 224 may be a radio frequency identification (RFID) tag, a universal product code (UPC) tag, a global positioning system (GPS) tag, and/or any other type of identification tag for identifying, locating, and/or tracking a container.

Container 220 may also include display device 226 coupled to, mounted on, attached to, or imbedded within container 220. Display device 226 is a multimedia display device for displaying textual, graphical, video, and/or audio marketing messages to a customer. For example, display device 226 may be a digital display screen or personal digital assistant attached to a handle, front, back, or side member of container 220.

Container 220 may optionally include an identification tag reader (not shown) for receiving data from identification tags 230 associated with retail items 228. Retail items 228 are items of merchandise for sale. Retail items 228 may be displayed on a display shelf (not shown) located in retail facility 202. Other items of merchandise may be for sale, such as, without limitation, food, beverages, shoes, clothing, household goods, decorative items, or sporting goods, may be hung from display racks, displayed in cabinets, on shelves, or in refrigeration units (not shown). Any other type of merchandise display arrangement known in the retail trade may also be used in accordance with the illustrative embodiments. For example, display shelves or racks may include, in addition to retail items 228, various advertising displays, images, or postings.

Retail items 228 may be viewed or identified by the illustrative embodiments using an image capture device or other detector in set of detectors 212. To facilitate identification, items may have attached identification tags 230. Identification tags 230 are tags associated with one or more retail items for identifying the item and/or location of the item. For example, identification tags 230 may be, without limitation, a bar code pattern, such as a universal product code (UPC) or European article number (EAN), a radio frequency identification (RFID) tag, or other optical identification tag, depending on the capabilities of the image capture device and associated data processing system to process the information and make an identification of retail items 228. In some embodiments, an optical identification may be attached to more than one side of a given item.

The data processing system, discussed in greater detail in FIG. 3 below, includes associated memory which may be an integral part, such as the operating memory, of the data processing system or externally accessible memory. Software for tracking objects may reside in the memory and run on the processor. The software is capable of tracking retail items 228, as a customer removes an item in retail items 228 from its display position and places the item into container 220. Likewise, the tracking software can track items which are being removed from container 220 and placed elsewhere in the retail store, whether placed back in their original display position or anywhere else including into another container. The tracking software can also track the position of container 220 and the customer.

The software can track retail items 228 by using data from one or more of detectors 204-210 located externally to retail facility, internal data captured by one or more detectors in set of detectors 212 located internally to retail facility 202, such as identification data received from identification tags 230 and/or identification data received from identification tag 224.

The software in the data processing system keeps a list of which items have been placed in each shopping container, such as container 220. The list is stored in a database, such as, without limitation, a spreadsheet, relational database, hierarchical database or the like. The database may be stored in the operating memory of the data processing system, externally on a secondary data storage device, locally on a recordable medium such as a hard drive, floppy drive, CD ROM, DVD device, remotely on a storage area network, such as storage area network 108 in FIG. 1, or in any other type of storage device.

The lists of items in container 220 are updated frequently enough to maintain a dynamic, accurate, real time listing of the contents of each container as customers add and remove items from containers, such as container 220. The listings of items in containers are also made available to whatever inventory system is used in retail facility 202. Such listings represent an up-to-the-minute view of which items are still available for sale, for example, to on-line shopping customers or customers physically located at retail facility 202. The listings may also provide a demand side trigger back to the supplier of each item. In other words, the listing of items in customer shopping containers can be used to update inventories, determine current stock available for sale to customers, and/or identification of items that need to be restocked or replenished.

At any time, the customer using container 220 may request to see a listing of the contents of container 220 by entering a query at a user interface to the data processing system. The user interface may be available at a kiosk, computer, personal digital assistant, or other computing device connected to the data processing system via a network connection. The user interface may also be coupled to a display device, such as, at a display device in display devices 214, display devices 216, or display device 226 associated with container 220. The customer may also make such a query after leaving the retail store. For example, a query may be made using a portable device or a home computer workstation.

The listing is then displayed at a location where it may be viewed by the customer on a display device. The listing may include the quantity of each item in container 220, as well as the brand, price of each item, discount or amount saved off the regular price of each item, and a total price for all items in container 220. Other data may also be displayed as part of the listing, such as, additional incentives to purchase one or more other items.

When the customer is finished shopping, the customer may proceed to a point-of-sale checkout station. The checkout station may be coupled to the data processing system, in which case, the items in container 220 are already known to the data processing system due to the dynamic listing of items in container 220 that is maintained as the customer shops in digital customer marketing environment 200. Thus, there is no need for an employee, customer, or other person to scan each item in container 220 to complete the purchase of each item, as is commonly done today. In this example, the customer merely arranges for payment of the total, for example by use of a smart card, credit card, debit card, cash, or other payment method. In some embodiments, it may not be necessary to empty container 220 at the retail facility at all if container 220 is a minimal cost item which can be kept by the customer.

In other embodiments, container 220 belongs to the customer. The customer brings container 220 to retail facility 202 at the start of the shopping session. In another embodiment, container 220 belongs to retail facility 202 and must be returned before the customer leaves digital customer marketing environment 200.

In another example, when the customer is finished shopping, the customer may complete checkout either in-aisle or from a final or terminal-based checkout position in the store using a transactional device which may be integral with container 220 or associated temporarily to container 220. The customer may also complete the transaction using a consumer owned computing device, such as a laptop, cellular telephone, or personal digital assistant that is connected to the data processing system via a network connection.

The customer may also make payment by swiping a magnetic strip on a card, using any known or available radio frequency identification (RFID) enabled payment device, or using a biometric device for identifying the customer by the customer's fingerprint, voiceprint, thumbprint, and/or retinal pattern. In such as case, the customer's account is automatically charged after the customer is identified.

The transactional device may also be a portable device such as a laptop computer, palm device, or any other portable device specially configured for such in-aisle checkout service, whether integral with container 220 or separately operable. In this example, the transactional device connects to the data processing system via a network connection to complete the purchase transaction at check out time.

Checkout may be performed in-aisle or at the end of the shopping trip whether from any point or from a specified point of transaction. As noted above, checkout transactional devices may be stationary shared devices or portable or mobile devices offered to the customer from the store or may be devices brought to the store by the customer, which are compatible with the data processing system and software residing on the data processing system.

Thus, in this depicted example, when a customer enters digital customer marketing environment but before the customer enters retail facility 202, such as a retail store, the customer is detected and identified by one or more detectors in detectors 204-210 to generate external data. The customer identification may be an exact identification of the customer by name, identification by an identifier, or an anonymous identification that is used to track the customer even though the customer's exact name and identity is not known. If the customer takes a shopping container before entering retail facility 202, the shopping container is also identified. In some embodiments, the customer may be identified through identification of container 220.

An analysis server in a data processing system associated with retail facility 202 begins performing data mining on available static customer data, such as, but not limited to, customer profile information and demographic information, for use in generating customized marketing messages targeted to the customer. In one embodiment, the customer is presented with customized digital marketing messages on one or more display devices in display devices 216 located externally to retail facility 202 before the customer enters retail facility 202.

The customer is tracked using image data and/or other detection data captured by detectors 204-210 as the customer enters retail facility 202. The customer is identified and tracked inside retail facility 202 by one or more detectors inside the facility, such as set of detectors 212.

When the customer enters retail facility 202, the customer is typically offered, provided, or permitted to take shopping container 220 for use during shopping.

When the customer takes a shopping container, such as container 220, the analysis server uses data from set of detectors 212, such as, identification data from identification tags 230 and 224, to track container 220 and items selected by the customer and placed in container 220.

As a result, an item selected by the customer, for example, as the customer removes the item from its stationary position on a store display, is identified. The selected item may be traced visually by a camera, tracked by another type of detector in set of detectors 212 and/or using identification data from identification tags 230. The item is tracked until the customer places it in container 220 to form a selected item.

Thus, a selected item is identified when a customer removes an item from a store display, such as a shelf, display counter, basket, or hanger. In another embodiment, the selected item is identified when the customer places the item in the customer's shopping basket, shopping bag, or shopping cart. The analysis server then selects one or more upsale items related to the selected items for marketing to the customer. In another embodiment, the analysis server selects one or more cross-sale items correlated to the selected item. The analysis server stores a listing of selected items placed in the shopping container.

Container 220 may contain a digital media display, such as display device 226, mounted on container 220 and/or customer may be offered a handheld digital media display device, such as a display device in display devices 214. In the alternative, the customer may be encouraged to use strategically placed kiosks running digital media marketing messages throughout retail facility 202. Display device 226, 214, and/or 216 may include a verification device for verifying an identity of the customer.

For example, display device 214 may include a radio frequency identification tag reader 232 for reading a radio frequency identification tag, a smart card reader for reading a smart card, or a card reader for reading a specialized store loyalty or frequent customer card. Once the customer has been verified, the data processing system retrieves past purchase history, total potential wallet-share, shopper segmentation information, customer profile data, granular demographic data for the customer, and/or any other available customer data elements using known or available data retrieval and/or data mining techniques. These customer data elements are analyzed using at least one data model to determine appropriate digital media content to be pushed, on-demand, throughout the store to customers viewing display devices 214, 216, and/or display device 226.

The customer is provided with incentives to use display devices 214, 216, and/or display device 226 to obtain marketing incentives, promotional offers, and discounts for upsale items and/or cross-sale items correlated to one or more selected items. When the customer has finished shopping, the customer may be provided with a list of savings or "tiered" accounting of savings over the regular price of purchased items if a display device had not been used to view and use customized digital marketing messages.

In this example, a single container and a single customer is described. However, the aspects of the illustrative embodiments may also be used to track multiple containers and multiple customers simultaneously. In this case, the analysis server will store a separate listing of selected items for each active customer. As noted above, the listings may be stored in a database. The listing of items in a given container is displayed to a customer, employee, agent, or other customer in response to a query. The listing may be displayed to a customer at any time, either while actively shopping, during check-out, or after the customer leaves retail facility 202.

This process provides an intelligent guided selling methodology to optimize customer throughput in the store, thereby maximizing or optimizing total retail content and/or retail sales, profit, and/or revenue for retail facility 202. It will be appreciated by one skilled in the art that the words "optimize", "optimization" and related terms are terms of art that refer to improvements in speed and/or efficiency of a computer program, and do not purport to indicate that a computer program has achieved, or is capable of achieving, an "optimal" or perfectly speedy/perfectly efficient state.

Figure 3:
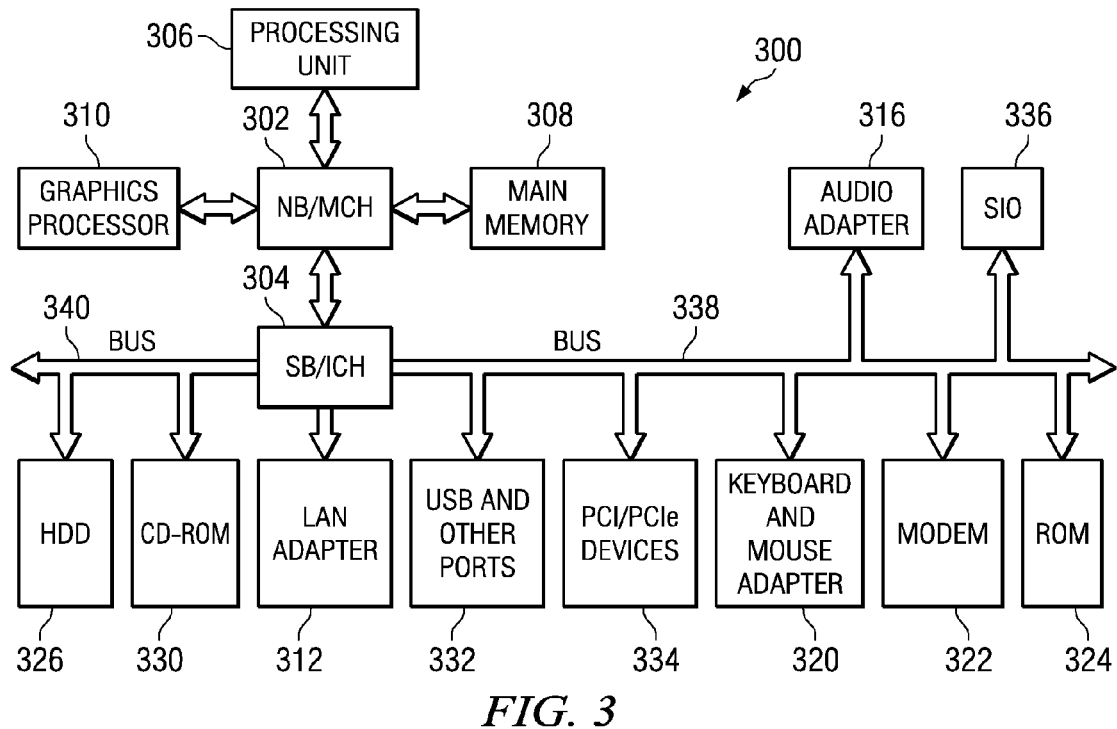
FIG. 3 is a block diagram of a data processing system in which illustrative embodiments may be implemented.

Next, FIG. 3 is a block diagram of a data processing system in which illustrative embodiments may be implemented. Data processing system 300 is an example of a computer, such as server 104 or client 110 in FIG. 1, in which computer usable code or instructions implementing the processes may be located for the illustrative embodiments. In this example, data is transmitted from data processing system 300 to the retail facility over a network, such as network 102 in FIG. 1. In another embodiment, data processing system 300 is located on-site at the retail facility.

In the depicted example, data processing system 300 employs a hub architecture including a north bridge and memory controller hub (MCH) 302 and a south bridge and input/output (I/O) controller hub (ICH) 304. Processing unit 306, main memory 308, and graphics processor 310 are coupled to north bridge and memory controller hub 302. Processing unit 306 may contain one or more processors and even may be implemented using one or more heterogeneous processor systems. Graphics processor 310 may be coupled to the MCH through an accelerated graphics port (AGP), for example.

In the depicted example, local area network (LAN) adapter 312 is coupled to south bridge and I/O controller hub 304 and audio adapter 316, keyboard and mouse adapter 320, modem 322, read only memory (ROM) 324, universal serial bus (USB) ports and other communications ports 332, and PCI/PCIe devices 334 are coupled to south bridge and I/O controller hub 304 through bus 338, and hard disk drive (HDD) 326 and CD-ROM drive 330 are coupled to south bridge and I/O controller hub 304 through bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be coupled to south bridge and I/O controller hub 304.

An operating system runs on processing unit 306 and coordinates and provides control of various components within data processing system 300 in FIG. 3. The operating system may be a commercially available operating system such as Microsoft Windows XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 300. Java and all Java-based trademarks are trademarks of Sun Microsystems, Inc. in the United States, other countries, or both.

Instructions for the operating system, the object-oriented programming system, and applications or programs are located on storage devices, such as hard disk drive 326, and may be loaded into main memory 308 for execution by processing unit 306. The processes of the illustrative embodiments may be performed by processing unit 306 using computer implemented instructions, which may be located in a memory such as, for example, main memory 308, read only memory 324, or in one or more peripheral devices.

In some illustrative examples, data processing system 300 may be a personal digital assistant (PDA), which is generally configured with flash memory to provide non-volatile memory for storing operating system files and/or customer-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 308 or a cache such as found in north bridge and memory controller hub 302. A processing unit may include one or more processors or CPUs.

Figure 4:
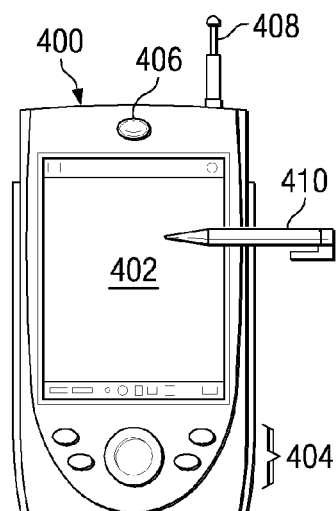
FIG. 4 is a diagram of a display device in the form of a personal digital assistant (PDA) in accordance with a preferred embodiment of the present invention.

With reference now to FIG. 4, a diagram of a display device in the form of a personal digital assistant (PDA) is depicted in accordance with a preferred embodiment of the present invention. Personal digital assistant 400 includes a display screen 402 for presenting textual and graphical information. Display screen 402 may be a known display device, such as a liquid crystal display (LCD) device. The display may be used to present a map or directions, calendar information, a telephone directory, or an electronic mail message. In these examples, display screen 402 may receive customer input using an input device such as, for example, stylus 410.

Personal digital assistant 400 may also include keypad 404, speaker 406, and antenna 408. Keypad 404 may be used to receive customer input in addition to using display screen 402. Speaker 406 provides a mechanism for audio output, such as presentation of an audio file. Antenna 408 provides a mechanism used in establishing a wireless communications link between personal digital assistant 400 and a network, such as network 102 in FIG. 1.

Personal digital assistant 400 also preferably includes a graphical user interface that may be implemented by means of systems software residing in computer readable media in operation within personal digital assistant 400.

Figure 5:
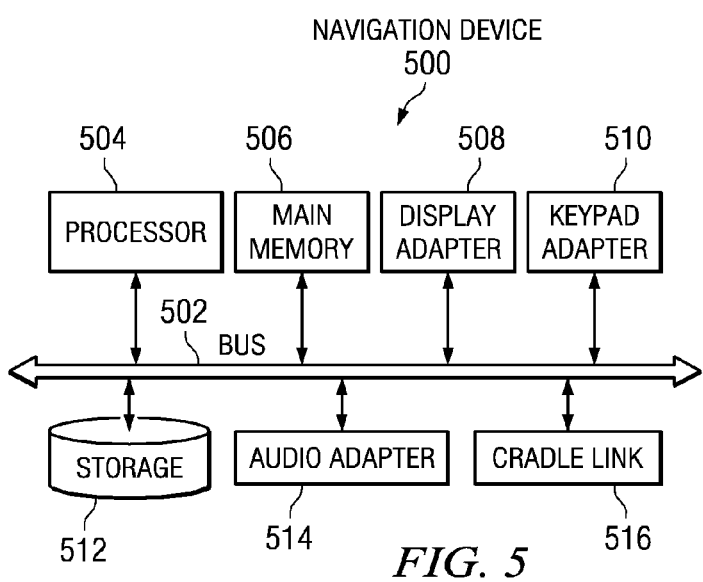
FIG. 5 is a block diagram of a personal digital assistant display device in accordance with a preferred embodiment of the present invention.

Turning now to FIG. 5, a block diagram of a personal digital assistant display device is shown in accordance with a preferred embodiment of the present invention. Personal digital assistant 500 is an example of a personal digital assistant, such as personal digital assistant 400 in FIG. 4, in which code or instructions implementing the processes of the present invention for displaying customized digital marketing messages may be located. Personal digital assistant 500 includes a bus 502 to which processor 504 and main memory 506 are connected. Display adapter 508, keypad adapter 510, storage 512, and audio adapter 514 also are connected to bus 502. Cradle link 516 provides a mechanism to connect personal digital assistant 500 to a cradle used in synchronizing data in personal digital assistant 500 with another data processing system. Further, display adapter 508 also includes a mechanism to receive customer input from a stylus when a touch screen display is employed.

An operating system runs on processor 504 and is used to coordinate and provide control of various components within personal digital assistant 500 in FIG. 5. The operating system may be, for example, a commercially available operating system such as Windows CE, which is available from Microsoft Corporation. Instructions for the operating system and applications or programs are located on storage devices, such as storage 512, and may be loaded into main memory 506 for execution by processor 504.

The depicted examples in FIGS. 1-5 are not meant to imply architectural limitations. The hardware in FIGS. 1-5 may vary depending on the implementation. Other internal hardware or peripheral devices, such as flash memory, equivalent non-volatile memory, or optical disk drives and the like, may be used in addition to or in place of the hardware depicted in FIGS. 1-5. Also, the processes of the illustrative embodiments may be applied to a multiprocessor data processing system.

Figure 6:
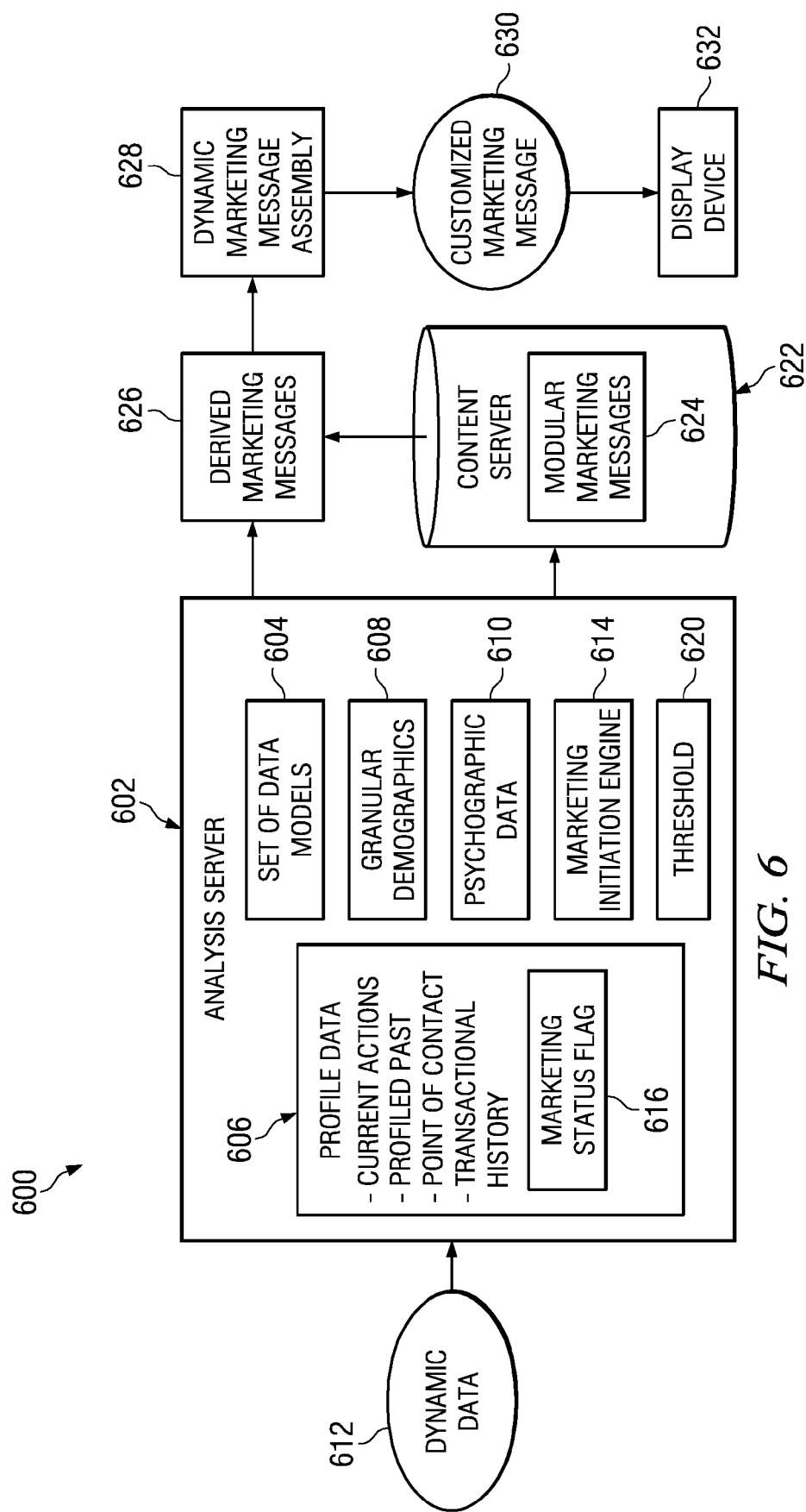
FIG. 6 is a block diagram of a data processing system for analyzing dynamic customer data in accordance with an illustrative embodiment.

Referring now to FIG. 6, a block diagram of a data processing system for analyzing dynamic customer data is shown in accordance with an illustrative embodiment. Data processing system 600 is a data processing system, such as data processing system 100 in FIG. 1 and/or data processing system 300 in FIG. 3.

Analysis server 602 is any type of known or available server for analyzing dynamic customer data elements for use in generating customized digital marketing messages. Analysis server 602 may be a server, such as server 104 in FIG. 1 or data processing system 300 in FIG. 3. Analysis server 602 includes set of data models 604 for analyzing dynamic customer data elements and static customer data elements.

Set of data models 604 is one or more data models created a priori or pre-generated for use in analyzing customer data objects for personalizing content of marketing messages presented to the customer. Set of data models 604 includes one or more data models for identifying customer data objects and determining relationships between the customer data objects. The data models in set of data models 604 are generated using at least one of a statistical method, a data mining method, a causal model, a mathematical model, a marketing model, a behavioral model, a psychological model, a sociological model, or a simulation model.

Profile data 606 is data regarding one or more customers. In this example, profile data 606 includes point of contact data, profiled past data, current actions data, transactional history data, certain click-stream data, granular demographics 608, psychographic data 610, registration e.g. customer provided data, and account data and/or any other data regarding a customer.

Point of contact data is data regarding a method or device used by a customer to interact with a data processing system of a merchant or supplier and/or receive customized marketing message 630 for display. The customer may interact with the merchant or supplier using a computing device or display terminal having a user interface for inputting data and/or receiving output. The device or terminal may be a device provided by the retail facility and/or a device belonging to or provided by the customer. For example, the display or access device may include, but is not limited to, a cellular telephone, a laptop computer, a desktop computer, a computer terminal kiosk, personal digital assistant (PDA) such as a personal digital assistant 400 in FIG. 4 or personal digital assistant 500 in FIG. 5 or any other display or access device, such as display device 632.

If display device 632 is a display device associated with the retail facility, details and information regarding display device 632 will be known to analysis server 602. However, if display device 632 is a display device belonging to the customer or brought to the retail facility by the customer, analysis server 602 may identify the type of display device using techniques such as interrogation commands, cookies, or any other known or equivalent technique. From the type of device other constraints may be determined such as display size, resolution, refresh rate, color capability, keyboard entry capability, other entry capability such as pointer or mouse, speech recognition and response, language constraints, and any other fingertip touch point constraints and assumptions about customer state of the display device. For example, someone using a cellular phone may have a limited time window for making phone calls and be sensitive to location and local time of day, whereas a casual home browser may have a greater luxury of time and faster connectivity.

An indication of a location for the point of contact may also be determined. For example, global positioning system (GPS) coordinates of the customer may be determined if the customer device has such a capability whether by including a real time global positioning system receiver or by periodically storing global positioning system coordinates entered by some other method. Other location indications may also be determined such as post office address, street or crossroad coordinates, latitude-longitude coordinates or any other location indicating system.

Analysis server 602 may also determine the connectivity associated with the customer's point of contact. For example, the customer may be connected to the merchant or supplier in any of a number ways such as a modem, digital modem, network, wireless network, Ethernet, intranet, or high speed lines including fiber optic lines. Each way of connection imposes constraints of speed, latency, and/or mobility which can then also be determined.

The profiled past comprises data that may be used, in whole or in part, for individualization of customized marketing message 630. Global profile data may be retrieved from a file, database, data warehouse, or any other data storage device. Multiple storage devices and software may also be used to store profile data 606. Some or all of the data may be retrieved from the point of contact device, as well. The profiled past may comprise an imposed profile, global profile, individual profile, and demographic profile. The profiles may be combined or layered to define the customer for specific promotions and marketing offers.

In the illustrative embodiments, a global profile includes data on the customer's interests, preferences, and affiliations.

The profiled past may also comprise retrieving purchased data. Various firms provide data for purchase which is grouped or keyed to presenting a lifestyle or life stage view of customers by block or group or some other baseline parameter. The purchased data presents a view of one or more customers based on aggregation of data points such as, but not limited to geographic block, age of head of household, income level, number of children, education level, ethnicity, and purchasing patterns.

The profiled past may also include navigational data relating to the path the customer used to arrive at a web page which indicates where the customer came from or the path the customer followed to link to the merchant or supplier's web page. Transactional data of actions taken is data regarding a transaction. For example, transaction data may include data regarding whether the transaction is a first time transaction or a repeat transaction, and/or how much the customer usually spends. Information on how much a customer generally spends during a given transaction may be referred to as basket share. Data voluntarily submitted by the customer in responding to questions or a survey may also be included in the profiled past.

Current actions, also called a current and historical record, are also included in profile data 606. Current actions are data defining customer behavior. One source of current actions is listings of the purchases made by the customer, payments and returns made by the customer, and/or click-stream data from a point of contact device of the customer. Click-stream data is data regarding a customer's navigation of an online web page of the merchant or supplier. Click-stream data may include page hits, sequence of hits, duration of page views, response to advertisements, transactions made, and conversion rates. Conversion rate is the number of times the customer takes action divided by the number of times an opportunity is presented.

In this example, profiled past data for a given customer is stored in analysis server 602. However, in accordance with the illustrative embodiments, profiled past data may also be stored in any local or remote data storage device, including, but not limited to, a device such as storage area network 108 in FIG. 1 or read only memory (ROM) 324 and/or compact disk read only memory (CD-ROM) 330 in FIG. 3.

Granular demographics 608 is a source of static customer data elements. Static customer data elements are data elements that do not tend to change in real time, such as a customer's name, date of birth, and address. Granular demographics 608 provides a detailed demographics profile for one or more customers. Granular demographics 608 may include, without limitation, ethnicity, block group, lifestyle, life stage, income, and education data. Granular demographics 608 may be used as an additional layer of profile data 606 associated with a customer.

Psychographic data 610 refers to an attitude profile of the customer. Examples of attitude profiles include, without limitation, a trend buyer, a time-strapped person who prefers to purchase a complete outfit, a cost-conscious shopper, a customer that prefers to buy in bulk, or a professional buyer who prefers to mix and match individual items from various suppliers.

Dynamic data 612 is data that includes dynamic customer data elements that are changing in real-time. For example, dynamic customer data elements could include, without limitation, the current contents of a customer's shopping basket, the time of day, the day of the week, whether it is the customer's birthday or other holiday observed by the customer, customer's responses to marketing messages and/or items viewed by the customer, customer location, the customer's current shopping companions, the speed or pace at which the customer is walking through the retail facility, and/or any other dynamically changing customer information. Dynamic data 612 includes external data, grouping data, customer identification data, customer behavior data, and/or current events data.

Dynamic data 612 is processed and/or analyzed to generate customized marketing messages. Processing dynamic data 612 includes, but is not limited to, filtering dynamic data 612 for relevant data elements, combining dynamic data 612 with other dynamic customer data elements, comparing dynamic data 612 to baseline or comparison models for external data, and/or formatting dynamic data 612 for utilization and/or analysis in one or more data models in set of data models 604. The processed dynamic data 612 is analyzed and/or further processed using one or more data models in set of data models 604.

Marketing initiation engine 614 is software for analyzing dynamic data 612 using a first set of data models in set of data models 604 to identify a set of marketing initiation factors and set marketing status flag 616 associated with the customer using the set of marketing initiation factors. The marketing initiation factors indicate a degree of receptivity of the customer to marketing messages. The marketing initiation factors are used in a determination as to whether to set a status of the customer to an "initiate marketing" status or a "negative marketing" status.

Marketing status flag in profile data 606 is a flag in a customer profile for a particular customer. Marketing status flag 616 indicates whether customized marketing messages are delivered to the customer. The customized marketing messages are displayed to the customer in response to marketing initiation engine 614 setting marketing status flag 616 to a market status. Marketing initiation engine 614 sets the marketing status for the customer to a no market status in response to the set of marketing initiation factors indicating the customer is unreceptive to marketing messages. A negative marketing status indicates that customized marketing messages are not transmitted to any display devices for display to the customer.

In this example, marketing initiation engine 614 retrieves a customer profile for the customer from profile data 606. The customer profile indicates customary days of the week the customer has shopped in the past, customary times of day when the customer has shopped at the retail facility, a customary grouping category, and/or past behavior of the customer while shopping at the retail facility on a different shopping trip.

The customary day of the week is a day of the week on which the customer shops frequently or customarily shops. A day of the week is a customary day of the week if the customer has shopped at the retail facility on that day of the week for a threshold percentage of the total shopping visits. In another embodiment, a day of the week is a customary day of the week if the customer has shopped at the retail facility on that day of the week for threshold 620 number of times.

In response to determining that the current day of the week is a customary day of the week in the customary days of the week the customer has shopped in the past, marketing initiation engine 614 generates positive marketing initiation factors. If the current day of the week is not a customary day of the week in the customary days of the week the customer has shopped in the past, marketing initiation engine 614 generates negative marketing initiation factors.

The customary time of day is a time of the day during which the customer frequently or customarily shops. A time of day is a customary time of day if the customer has shopped at the retail facility at that time of day for threshold 620 percentage of the customer's total shopping visits. In another embodiment, a time of day is a time of day if the customer has shopped at the retail facility at that time of day for threshold 620 number of times.

If the current time falls within a range of the customary times of day, marketing initiation engine 614 generates positive marketing initiation factors. If the current time falls outside of a range of the customary times of day, marketing initiation engine 614 generates negative marketing initiation factors.

Grouping data is dynamic data that identifies a grouping category for the customer. A grouping category is a description of a group or shopping companions of the customer while the customer is shopping. A grouping category includes, without limitation, parents with children, teenagers, minors unaccompanied by adults, minors accompanied by adults, grandparents with grandchildren, senior citizens, couples, friends, coworkers, customer with a pet, customer with a dog, customer with a cat, and a customer shopping alone.

A customary grouping category describes the companions a customer usually shops with. If the current grouping category for the customer is a customary grouping category in the customary grouping categories, marketing initiation engine 614 generates positive marketing initiation factors. If the current grouping category for the customer is a grouping category that is different than the customary grouping categories, marketing initiation engine 614 generates negative marketing initiation factors. For example, if a customary grouping category indicates the customer usually shops alone and the current grouping category indicates the customer is shopping with three children, marketing initiation engine 614 generates negative marketing initiation factors.

Marketing initiation engine 614 compares the current customer behavior data to the past customer behavior data. If the comparison indicates the customer is walking at a customary pace or shopping at a customary rate, marketing initiation engine 614 generates positive marketing initiation factors. If the comparison indicates the customer is walking at a pace that is faster than the customary pace or shopping at a rate that is faster than the customary rate of shopping, marketing initiation engine 614 generates negative marketing initiation factors.

Content server 622 is any type of known or available server for storing modular marketing messages 624. Content server 622 may be a server, such as server 104 in FIG. 1 or data processing system 300 in FIG. 3.

Modular marketing messages 624 are two or more self contained marketing messages that may be combined with one or more other modular marketing messages in modular marketing messages 624 to form a customized marketing message for display to the customer. Modular marketing messages 624 can be quickly and dynamically assembled and disseminated to the customer in real-time.

In this illustrative example, modular marketing messages 624 are pre-generated. In other words, modular marketing messages 624 are preexisting marketing message units that are created prior to analyzing dynamic data 612 associated with a customer using one or more data models to generate a personalized marketing message for the customer. Two or more modular marketing messages are combined to dynamically generate customized marketing message 630, customized or personalized for a particular customer. Although modular marketing messages 624 are pre-generated, modular marketing messages 624 may also include templates imbedded within modular marketing messages for adding personalized information, such as a customer's name or address, to the customized marketing message.

Derived marketing messages 626 is a software component for determining which modular marketing messages in modular marketing messages 624 should be combined or utilized to dynamically generate customized marketing message 630 for the customer in real time. Derived marketing messages 626 uses the output generated by analysis server 602 as a result of analyzing dynamic data 612 associated with a customer using one or more appropriate data models in set of data models 604 to identify one or more modular marketing messages for the customer. The output generated by analysis server 602 from analyzing dynamic data 612 using appropriate data models in set of data models 604 includes marketing message criteria for the customer.

In other words, dynamic data 612 is analyzed to generate personal marketing message criteria. Derived marketing messages 626 uses the marketing message criteria for the customer to select one or more modular marketing messages in modular marketing messages 624.

A customized marketing message is generated using personalized marketing message criteria that are identified using the dynamic data. Personalized marketing message criteria are criterion or indicators for selecting one or more modular marketing messages for inclusion in the customized marketing message. The personalized marketing message criteria may include one or more criterion. The personalized marketing message criteria may be generated, in part, a priori or pre-generated and in part dynamically in real-time based on the dynamic data for the customer and/or any available static customer data associated with the customer. Dynamic data 612 includes external data gathered outside the retail facility and/or dynamic data gathered inside the retail facility.

If an analysis of dynamic data 612 indicates that the customer is shopping with a large dog, the personal marketing message criteria may include criteria to indicate marketing of pet food and items for large dogs. Because people with large dogs often have large yards, the personal marketing message criteria may also indicate that yard items, such as yard fertilizer, weed killer, or insect repellant may should be marketed. The personal marketing message criteria may also indicate marketing elements designed to appeal to animal lovers and pet owners, such as incorporating images of puppies, images of dogs, phrases such as "man's best friend", "puppy love", advice on pet care and dog health, and/or other pet friendly images, phrases, and elements to appeal to the customer's tastes and interests.

Derived marketing messages 626 uses the output of one or more data models in set of data models 604 that were used to analyze dynamic data 612 associated with a customer to identify one or more modular marketing messages to be combined together to form the personalized marketing message for the customer.

For example, a first modular marketing message may be a special on a more expensive brand of peanut butter. A second modular marketing message may be a discount on jelly when peanut butter is purchased. In response to marketing message criteria that indicates the customer frequently purchases cheaper brands of peanut butter, the customer has children, and the customer is currently in an aisle of the retail facility that includes jars of peanut butter, derived marketing messages 626 will select the first marketing message and the second marketing message based on the marketing message criteria for the customer.

Dynamic marketing message assembly 628 is a software component for combining the one or more modular marketing messages selected by derived marketing messages 626 to form customized marketing message 630. Dynamic marketing message assembly 628 combines modular marketing messages selected by derived marketing messages 626 to create appropriate customized marketing message 630 for the customer. In the example above, after derived marketing messages 626 selects the first modular marketing message and the second modular marketing message based on the marketing message criteria, dynamic marketing message assembly 628 combines the first and second modular marketing messages to generate a customized marketing message offering the customer a discount on both the peanut butter and jelly if the customer purchases the more expensive brand of peanut butter. In this manner, dynamic marketing message assembly 628 provides assembly of customized marketing message 630 based on output from the data models analyzing dynamic data.

Customized marketing message 630 is a customized and unique marketing message for a customer. The marketing message is a one-to-one customized marketing message for a specific customer. Customized marketing message 630 is generated using dynamic data 612 and/or static customer data elements, such as the customer's demographics and psychographics, to achieve this unique one-to-one marketing.

Customized marketing message 630 is generated for a particular customer based on dynamic customer data elements, such as grouping data, customer identification data, current events data, and customer behavior data. For example, if modular marketing messages 624 include marketing messages identified by numerals 1-20, customized marketing message 630 may be generated using marketing messages 2, 8, 9, and 19. In this example, modular marketing messages 2, 8, 9, and 19 are combined to create a customized marketing message that is generated for display to the customer rather than displaying the exact same marketing messages to all customers. Customized marketing message 630 is displayed on display device 632.

Customized marketing message 630 may include advertisements, sales, special offers, incentives, opportunities, promotional offers, rebate information and/or rebate offers, discounts, and opportunities. An opportunity may be a "take action" opportunity, such as asking the customer to make an immediate purchase, select a particular item, request a download, provide information, or take any other type of action.

Customized marketing message 630 may also include content or messages pushing advertisements and opportunities to effectively and appropriately drive the point of contact customer to some conclusion or reaction desired by the merchant.

Customized marketing message 630 is formed in a dynamic closed loop manner in which the content delivery depends on dynamic data 612, as well as other dynamic customer data elements and static customer data, such as profile data 606 and granular demographics 608. Therefore, all interchanges with the customer may sense and gather data associated with customer behavior, which is used to generate customized marketing message 630.

Display device 632 is a multimedia display for presenting customized marketing messages to one or more customers. Display device 632 may be a multimedia display, such as, but not limited to, display devices 214, 216, and 226 in FIG. 2. Display device 632 may be, for example, a personal digital assistant (PDA), a cellular telephone with a display screen, an electronic sign, a laptop computer, a tablet PC, a kiosk, a digital media display, a display screen mounted on a shopping container, and/or any other type of device for displaying digital messages to a customer.

Thus, a merchant has a capability for interacting with the customer on a direct one-to-one level by sending customized marketing message 630 to display device 632. Customized marketing message 630 may be sent and displayed to the customer via a network. For example, customized marketing message 630 may be sent via a web site accessed as a unique uniform resource location (URL) address on the World Wide Web, as well as any other networked connectivity or conventional interaction including, but not limited to, a telephone, computer terminal, cell phone or print media.

Display device 632 may be a display device mounted on a shopping cart, a shopping basket, a shelf or compartment in a retail facility, included in a handheld device carried by the customer, or mounted on a wall in the retail facility. In response to displaying customized marketing message 630, a customer can select to print the customized marketing message 630 as a coupon and/or as a paper or hard copy for later use. In another embodiment, display device 632 automatically prints customized marketing message 630 for the customer rather than displaying customized marketing message 630 on a display screen or in addition to displaying customized marketing message 630 on the display screen.

In another embodiment, display device 632 provides an option for a customer to save customized marketing message 630 in an electronic form for later use. For example, the customer may save customized marketing message 630 on a hand held display device, on a flash memory, a customer account in a data base associated with analysis server 602, or any other data storage device. In this example, when customized marketing message 630 is displayed to the customer, the customer is presented with a "use offer now" option and a "save offer for later use" option. If the customer chooses the "save offer" option, the customer may save an electronic copy of customized marketing message 630 and/or print a paper copy of customized marketing message 630 for later use.

In this example, customized marketing message 630 is generated and delivered to the customer.

Figure 7:
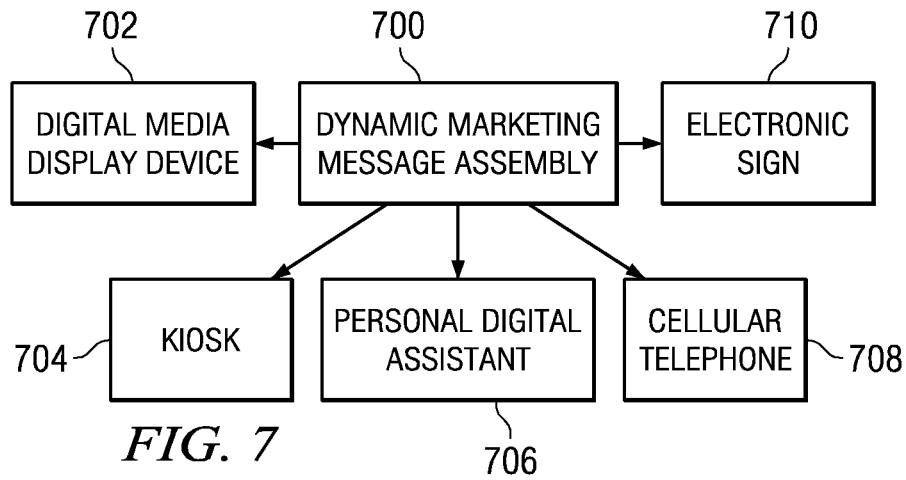
FIG. 7 is a block diagram of a dynamic marketing message assembly transmitting a customized marketing message to a set of display devices in accordance with an illustrative embodiment.

FIG. 7 is a block diagram of a dynamic marketing message assembly transmitting a customized marketing message to a set of display devices in accordance with an illustrative embodiment. Dynamic marketing message assembly 700 is a software component for combining two or more modular marketing messages into a customized marketing message for a customer. Dynamic marketing message assembly 700 may be a component such as dynamic marketing message assembly 628 in FIG. 6.

Dynamic marketing message assembly 700 transmits a customized marketing message, such as customized marketing message 430 in FIG. 4, to one or more display devices in a set of display devices. In this example, the set of display devices includes, but is not limited to, digital media display device 702, kiosk 704, personal digital assistant 706, cellular telephone 708, and/or electronic sign 710. A set of display devices in accordance with the illustrative embodiments may include any combination of display devices and any number of each type of display device. For example, a set of display devices may include, without limitation, six kiosks, fifty personal digital assistants, and no cellular telephones. In another example, the set of display devices may include electronic signs and kiosks but no personal digital assistants or cellular telephones.

Digital media display device 702 is any type of known or available digital media display device for displaying a marketing message. Digital media display device 702 may include, but is not limited to, a monitor, a plasma screen, a liquid crystal display screen, and/or any other type of digital media display device.

Kiosk 704 is any type of known or available kiosk. In one embodiment, a kiosk is a structure having one or more open sides, such as a booth. The kiosk includes a computing device associated with a display screen located inside or in association with the structure. The computing device may include a user interface for a user to provide input to the computing device and/or receive output. For example, the user interface may include, but is not limited to, a graphical user interface (GUI), a menu-driven interface, a command line interface, a touch screen, a voice recognition system, an alphanumeric keypad, and/or any other type of interface.

Personal digital assistant 706 is any type of known or available personal digital assistant (PDA). Cellular telephone 708 is any type of known or available cellular telephone and/or wireless mobile telephone. Cellular telephone 708 includes a display screen that is capable of displaying pictures, graphics, and/or text. Additionally, cellular telephone 708 may also include an alphanumeric keypad, joystick, and/or buttons for providing input to cellular telephone 708. The alphanumeric keypad, joystick, and/or buttons may be used to initiate various functions in cellular telephone 708. These functions include for example, activating a menu, displaying a calendar, receiving a call, initiating a call, displaying a customized marketing message, saving a customized marketing message, and/or selecting a saved customized marketing message.

Electronic sign 710 is any type of electronic messaging system. For example, electronic sign 710 may include, without limitation, an outdoor electronic light emitting diode (LED) display, moving message boards, variable message signs, tickers, electronic message centers, video boards, and/or any other type of electronic signage.

The display device may also include, without limitation, a laptop computer, a smart watch, a digital message board, a monitor, a tablet PC, a printer for printing the customized marketing message on a paper medium, or any other output device for presenting output to a customer.

A display device may be located externally to the retail facility to display marketing messages to the customer before the customer enters the retail facility. In another embodiment, the customized marketing message is displayed to the customer on a display device inside the retail facility after the customer enters the retail facility and begins shopping.

Figure 8:
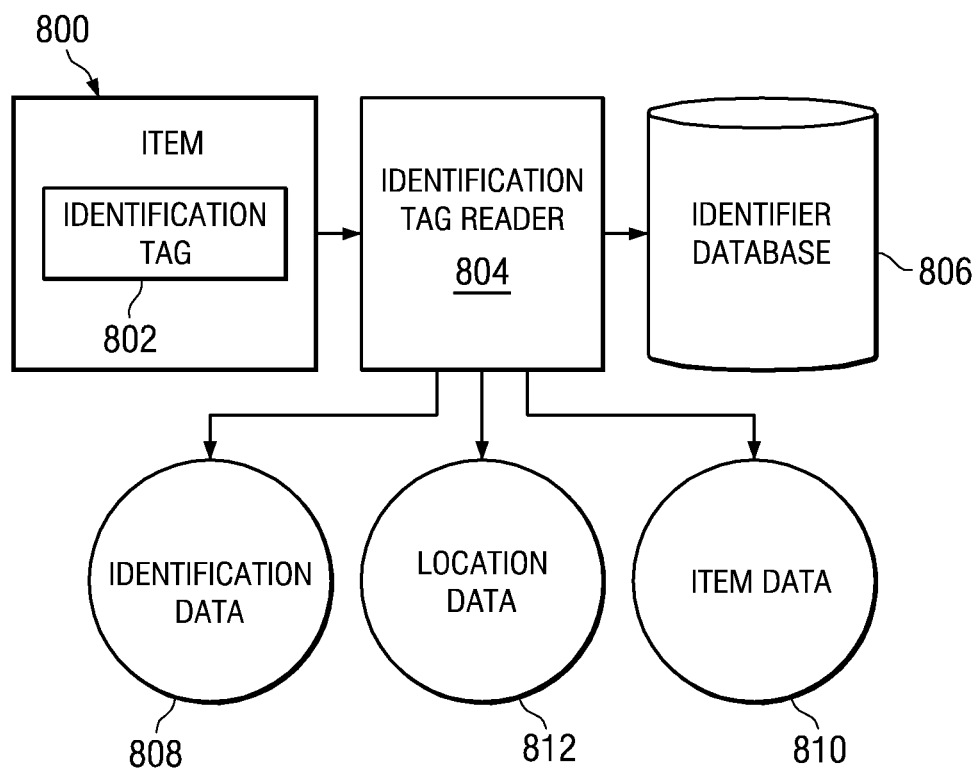
FIG. 8 is a block diagram of an identification tag reader for identifying items selected by a customer in accordance with an illustrative embodiment.

Turning now to FIG. 8, a block diagram of an identification tag reader for identifying items selected by a customer is shown in accordance with an illustrative embodiment. Item 800 is any type of item, such as retail items 228 in FIG. 2. Identification tag 802 associated with item 800 is a tag for providing information regarding item 800 to identification tag reader 804. Identification tag 802 is a tag such as a tag in identification tags 230 in FIG. 2. Identification tag 802 may be a bar code, a radio frequency identification tag, a global positioning system tag, and/or any other type of tag.

Radio Frequency Identification tags include read-only identification tags and read-write identification tags. A read-only identification tag is a tag that generates a signal in response to receiving an interrogate signal from an item identifier. A read-only identification tag does not have a memory. A read-write identification tag is a tag that responds to write signals by writing data to a memory within the identification tag. A read-write tag can respond to interrogate signals by sending a stream of data encoded on a radio frequency carrier. The stream of data can be large enough to carry multiple identification codes. In this example, identification tag 802 is a radio frequency identification tag.

Identification tag reader 804 is any type of known or available device for retrieving information from identification tag 802. Identification tag reader 804 may be, but is not limited to, a radio frequency identification tag reader or a bar code reader, such as identification tag reader 232 in FIG. 2. A bar code reader is a device for reading a bar code, such as a universal product code. In this example, identification tag reader 804 provides identification data 808, item data 810, and/or location data 812 to an analysis server, such as analysis server 402 in FIG. 4.

Identification data 808 is data regarding the product name and/or manufacturer name of item 800 selected for purchase by a customer. Item data 810 is information regarding item 800, such as, without limitation, the regular price, sale price, product weight, and/or tare weight for item 800. Identification data 808 is used to identify an item selected by a customer for purchase.

Location data 812 is data regarding a location of item 800 within the retail facility and/or outside the retail facility. For example, if identification tag 802 is a bar code, the item associated with identification tag 802 must be in close physical proximity to identification tag reader 804 for a bar code scanner to read a bar code on item 800. Therefore, location data 812 is data regarding the location of identification tag reader 804 currently reading identification tag 802. However, if identification tag 802 is a global positioning system tag, a substantially exact or precise location of item 800 may be obtained using global positioning system coordinates obtained from the global positioning system tag.

Identifier database 806 is a database for storing any information that may be needed by identification tag reader 804 to read identification tag 802. For example, if identification tag 802 is a radio frequency identification tag, identification tag will provide a machine readable identification code in response to a query from identification tag reader 804. In this case, identifier database 806 stores description pairs that associate the machine readable codes produced by identification tags with human readable descriptors. For example, a description pair for the machine readable identification code "10141014111111" associated with identification tag 802 would be paired with a human readable item description of item 800, such as "orange juice." An item description is a human understandable description of an item. Human understandable descriptions are for example, text, audio, graphic, or other representations suited for display or audible output.

Figure 9:
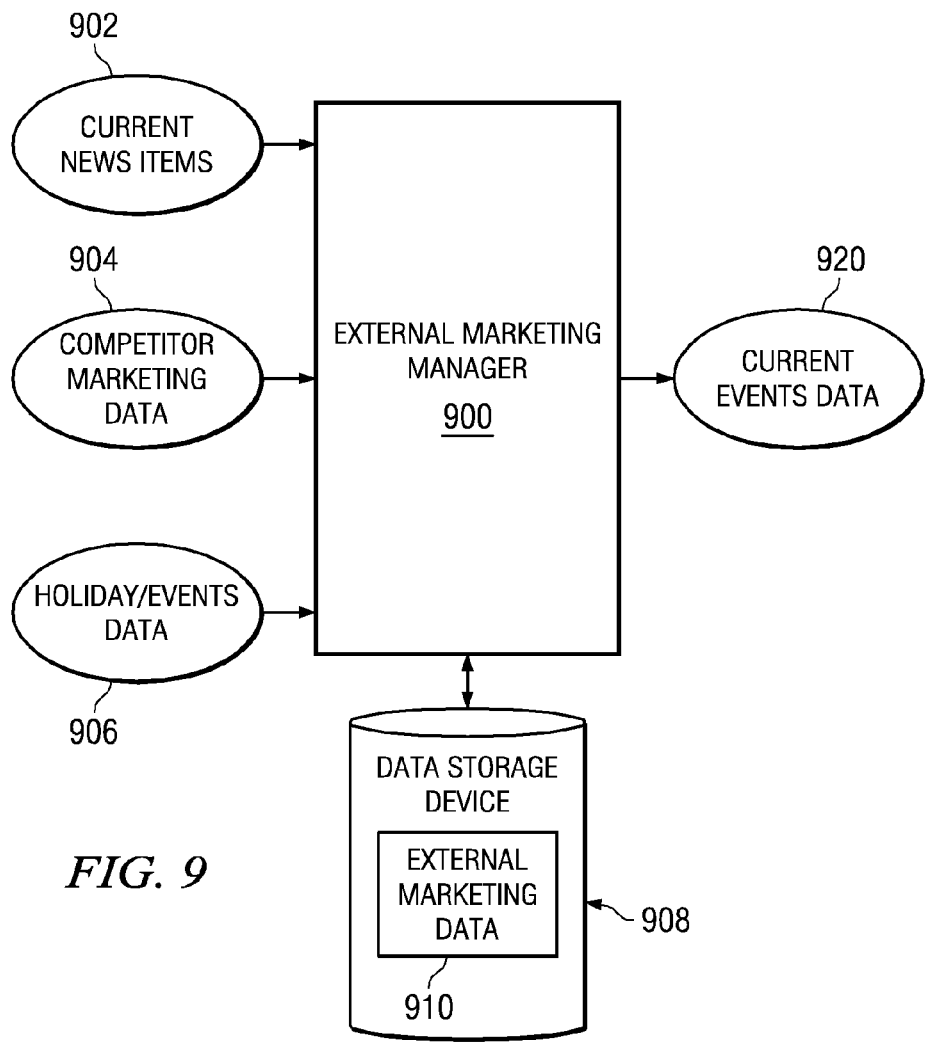
FIG. 9 is a block diagram illustrating an external marketing manager for generating current events data in accordance with an illustrative embodiment.

FIG. 9 is a block diagram illustrating an external marketing manager for generating current events data in accordance with an illustrative embodiment. External marketing manager 900 is a software component for collecting current news items 902, competitor marketing data 904, holidays, seasonal events, seasonal celebrations, and/or events data 906, and/or any other current events or news data from a set of sources. The set of sources may include one or more sources. A source may be, without limitation, a newspaper, catalog, a web page or other network resource, a television program or commercial, a flier, a pamphlet, a book, a booklet, a news board, a coupon board, a news group, a blog, a magazine, a religious calendar, a secular calendar, or any other paper or electronic source of information. A source may also include information provided by a human user.

External marketing manager 900 stores current news items 902, competitor marketing data 904, holidays and/or events data 906, and/or any other current events or news data in data storage device 908 as external marketing data 910. Data storage device 908 may be implemented as any type of data storage device, including, without limitation, a hard disk, a database, a main memory, a flash memory, a random access memory (RAM), a read only memory (ROM), or any other data storage device.

In this example, external marketing manager 900 filters or processes external marketing data 910 to form current events data 920. Filtering external marketing data 910 may include selecting data items or data objects associated with marketing one or more items to a customer. A data item or data object associated with marketing one or more items is a data element that may influence a customer's decision to purchase a product. For example, the occurrence of a sporting event may influence the items selected for purchase by a customer, such as pizza, large screen televisions, and beer.

A data element indicating the occurrence of a holiday or religious event, such as Christmas or Thanksgiving, may also influence the items purchased by a customer. For example, as Thanksgiving approaches, customers are more likely to purchase turkey and pumpkin pie. At Easter, customers are more likely to purchase ham and Easter eggs.

A data element indicating that a storm or hurricane is approaching may influence projects such as installing storm shutters and generators. These data elements that may influence customer purchases and sales of items are selected to form current events data 920. Current events data 920 is then sent to an analysis server, such as analysis server 602 in FIG. 6 for use in identifying items of interest to a customer.

In this example, external marketing manager 900 filters external marketing data 910 for relevant data elements to form current events data 920 without intervention by a human user. In another embodiment, a human user filters external marketing data 910 manually to generate current events data 920. The analysis server uses the current events data to identify an event of interest to the customer that occurs within a predetermined period of time. For example, if a customer profile and dynamic data indicates that the customer is Catholic and current events data 920 indicates Mardi Gras is approaching, the analysis server can identify items associated with Mardi Gras, such as King Cake, Marti Gras beads, and masks.

Figure 10:
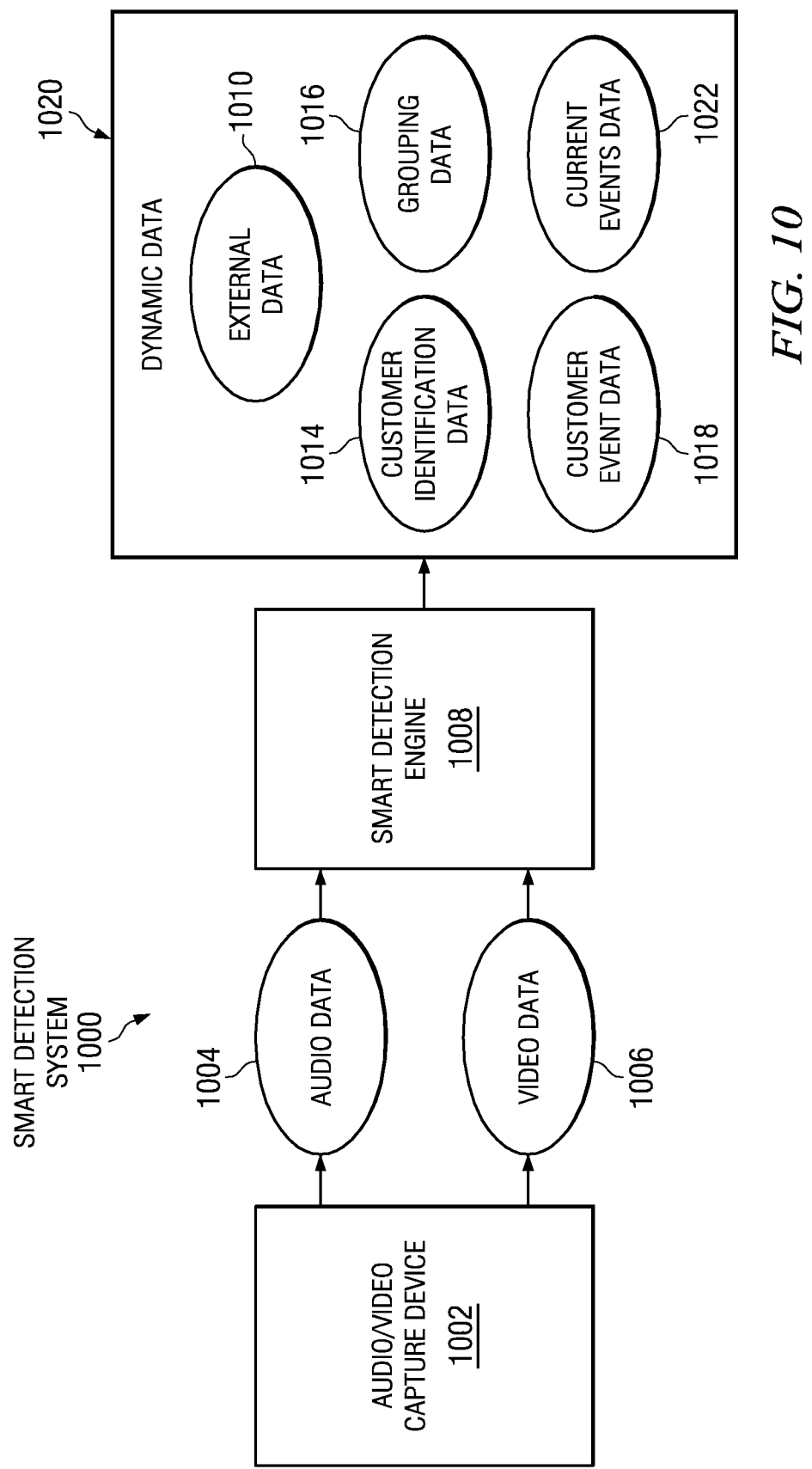
FIG. 10 is a block diagram illustrating a smart detection engine for generating customer identification data and selected item data in accordance with an illustrative embodiment.

FIG. 10 is a block diagram illustrating a smart detection engine for generating customer identification data and selected item data in accordance with an illustrative embodiment. Smart detection system 1000 is a software architecture for analyzing camera images and other detection data to form dynamic data 1020. In this example, the detection data is video images captured by a camera. However, the detection data may also include, without limitation, pressure sensor data captured by a set of pressure sensors, heat sensor data captured by a set of heat sensors, motion sensor data captured by a set of motion sensors, audio captured by an audio detection device, such as a microphone, or any other type of detection data described herein.

Audio/video capture device 1002 is a device for capturing video images and/or capturing audio. Audio/video capture device 1002 may be, but is not limited to, a digital video camera, a microphone, a web camera, or any other device for capturing sound and/or video images.

Audio data 1004 is data associated with audio captured by audio/video capture device 1002, such as human voices, vehicle engine sounds, dog barking, horns, and any other sounds. Audio data 1004 may be a sound file, a media file, or any other form of audio data. Audio/video capture device 1002 captures audio associated with a set of one or more customers inside a retail facility and/or outside a retail facility to form audio data 1004.

Video data 1006 is image data captured by audio/video capture device 1002. Video data 1006 may be a moving video file, a media file, a still picture, a set of still pictures, or any other form of image data. Video data 1006 is video or images associated with a set of one or more customers inside a retail facility and/or outside a retail facility.

For example, video data 1006 may include images of a customer's face, an image of a part or portion of a customer's car, an image of a license plate on a customer's car, and/or one or more images showing a customer's behavior. An image showing a customer's behavior or appearance may show a customer wearing a long coat on a hot day, a customer walking with two small children which may be the customer's children or grandchildren, a customer moving in a hurried or leisurely manner, or any other type of behavior or appearance attributes of a customer, the customer's companions, or the customer's vehicle.

Audio/video capture device 1002 transmits audio data 1004 and video data 1006 to smart detection engine 1008. Audio data 1004 and video data 1006 may be referred to as detection data. Smart detection engine 1008 is software for analyzing audio data 1004 and video data 1006. In this example, smart detection engine 1008 processes audio data 1004 and video data 1006 into data and metadata to form dynamic data 1020. Dynamic data 1020 includes, but not limited to, external data 1010, customer identification data 1014, grouping data 1016, customer event data 1018, and current events data 1022. In one embodiment, current events data 1022 is generated by external marketing manager 900 in FIG. 9. However, in this example, the external marketing manager is optionally integrated within or connected to, smart detection engine 1008, such that smart detection engine 1008 generates current events data 1022.

Customer grouping data is data describing a customer's companions, such as children, parents, siblings, peers, friends, and/or pets.

Processing the audio data 1004 and video data 1006 may include filtering audio data 1004 and video data 1006 for relevant data elements, analyzing audio data 1004 and video data 1006 to form metadata describing or categorizing the contents of audio data 1004 and video data 1006, or combining audio data 1004 and video data 1006 with other audio data, video data, and data associated with a group of customers received from cameras.

Smart detection engine 1008 uses computer vision and pattern recognition technologies to analyze audio data 1004 and/or video data 1006. Smart detection engine 1008 includes license plate recognition technology which may be deployed in a parking lot or at the entrance to a retail facility where the license plate recognition technology catalogs a license plate of each of the arriving and departing vehicles in a parking lot associated with the retail facility.

Smart detection engine 1008 includes behavior analysis technology to detect and track moving objects and classify the objects into a number of predefined categories. As used herein, an object may be a human customer, an item, a container, a shopping cart or shopping basket, or any other object inside or outside the retail facility. Behavior analysis technology could be deployed on various cameras overlooking a parking lot, a perimeter, or inside a facility.

Face detection/recognition technology may be deployed in parking lots, at entry ways, and/or throughout the retail facility to capture and recognize faces. Badge reader technology may be employed to read badges. Radar analytics technology may be employed to determine the presence of objects. Events from access control technologies can also be integrated into smart detection engine 1008.

The events from all the above detection technologies are cross indexed into a single repository, such as multi-mode database. In such a repository, a simple time range query across the modalities will extract license plate information, vehicle appearance information, badge information, and face appearance information, thus permitting an analyst to easily correlate these attributes.

Smart detection system 1000 may be implemented using any known or available software for performing voice analysis, facial recognition, license plate recognition, and sound analysis. In this example, smart detection system 1000 is implemented as IBM® smart surveillance system (S3) software.

The data gathered from the behavior analysis technology, license plate recognition technology, face detection/recognition technology, badge reader technology, radar analytics technology, and any other video/audio data received from a camera or other video/audio capture device is received by smart detection engine 1008 for processing into dynamic data 1020.

Figure 11:
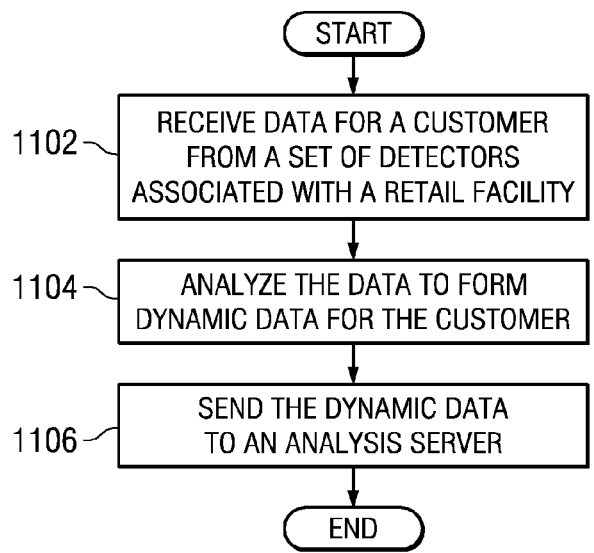
FIG. 11 is a flowchart illustrating a process for generating dynamic data for a customer in accordance with an illustrative embodiment.

FIG. 11 is a flowchart illustrating a process for generating dynamic data for a customer in accordance with an illustrative embodiment. The process is implemented by smart detection system 1000 in FIG. 10. The process begins by receiving data for a customer from a set of detectors associated with the retail facility (step 1102). The data may be, without limitation, audio and/or video data from a camera located either inside or outside the retail facility. The process analyzes the data to form dynamic data for the customer (step 1104). The analysis involves using behavior analysis, license plate recognition, facial recognition, badge reader, radar analytics, and other analysis on the data. The process sends the dynamic data to an analysis server (step 1106) with the process terminating thereafter.

Figure 12:
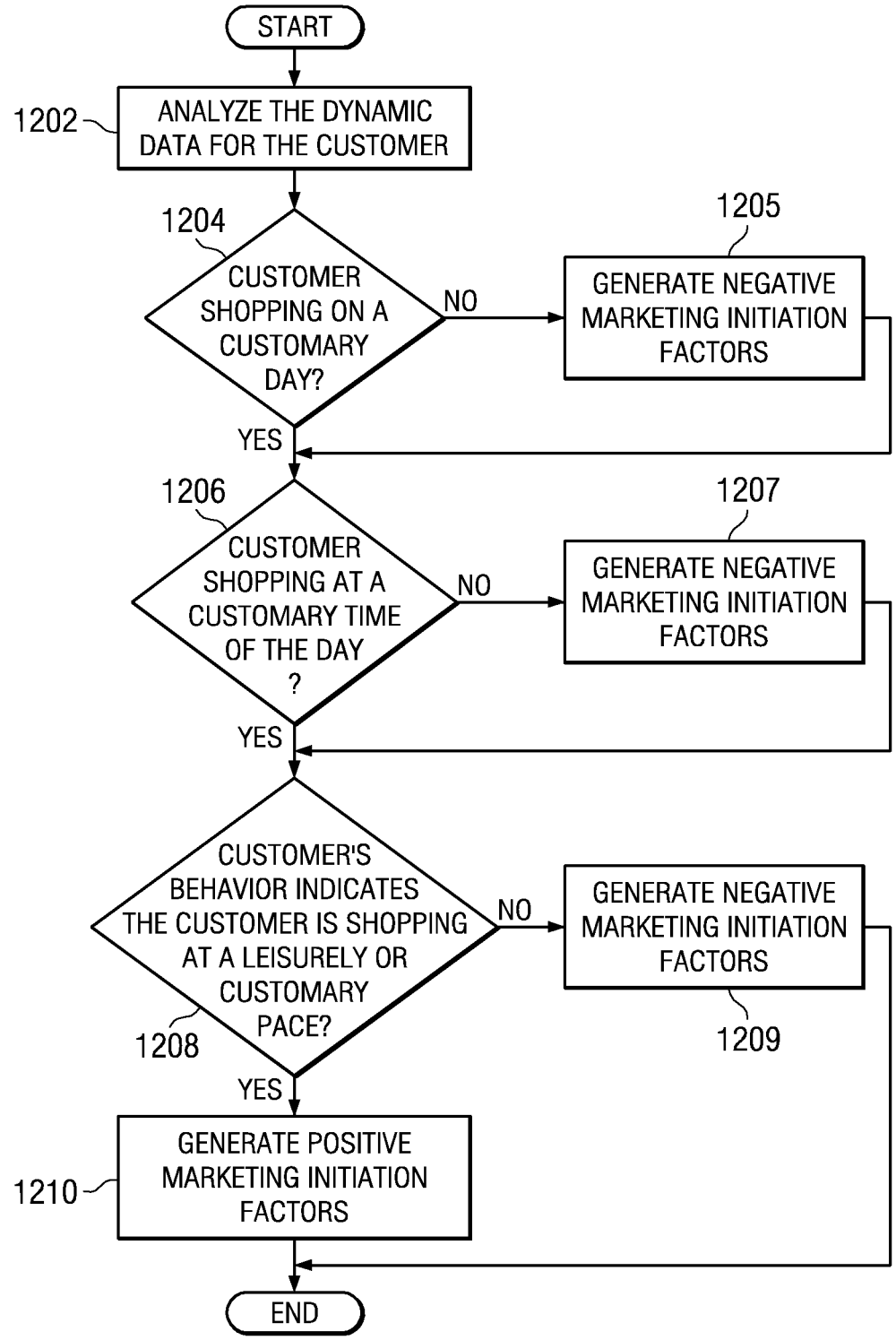
FIG. 12 is a flowchart illustrating a process for generating marketing initiation factors in accordance with an illustrative embodiment.

FIG. 12 is a flowchart illustrating a process for generating marketing initiation factors in accordance with an illustrative embodiment. The process is implemented by marketing initiation engine 614 in FIG. 6. The process begins by analyzing the dynamic data for a customer (step 1202). The process makes a determination as to whether the customer is shopping on a customary day (step 1204). For example, if the customer shops on Saturdays a majority of the time and the customer is now shopping on a Monday, the customer is not shopping on a customary day of the week. In another embodiment, the customer is not shopping on a customary day if the customer is shopping on a day of the week on which the customer has never shopped before or a day of the week on which the customer has not shopped on for at least a threshold number of times. If the customer is not shopping on a customary day of the week, the process generates negative marketing initiation factors (step 1205).

The process makes a determination as to whether the customer is shopping at a customary time of the day (step 1206). For example, if a majority of the customer's shopping visits to the retail facility take place in the afternoon and the customer is now shopping at midnight, the customer is not shopping at a customary time of day. In another embodiment, the customer is not shopping at a customary time of day if the customer is shopping at a time of day at which the customer has never shopped before or at a time of day on which the customer has not shopped for at least a threshold number of times. In other words, if the customer has not shopped at midnight for at least a threshold number of shopping visits to the retail facility, the customer is not shopping at a customary time of day. If the customer is not shopping at a customary time of day, the process generates negative marketing initiation factors (step 1207).

The process makes a determination as to whether the customer's behavior indicates the customer is shopping at a leisurely or customary pace (step 1208). If the customer's behavior is hurried or rushed, the customer is walking at a fast pace, the customer is not taking as much time as normal to browse the store shelves, and/or the customer is selecting items more quickly than usual, the customer is not shopping at a leisurely pace. If the customer is not shopping at a leisurely or customary pace, the process generates negative marketing initiation factors (step 1209) with the process terminating thereafter.

If the customer is shopping on a customary day of the week, at a customary time of day, and the customer's behavior indicates the customer is shopping at a leisurely pace, the process generates positive marketing initiation factors (step 1210) with the process terminating thereafter.

The steps in FIG. 12 may be implemented in any order. Additional steps may also be included in the process of FIG. 12 that are not shown in FIG. 12. In addition, some of the steps in FIG. 12 may be eliminated from the process in FIG. 12. For example, step 1206 may be implemented before step 1204. In addition, step 1210 may be implemented after step 1204 and step 1206. In other words, positive marketing initiation factors may be generated in response to the customer shopping on a customary day of the week, even if the customer is not shopping at a customary time of day. Positive marketing initiation factors may be generated for the customer shopping on a customary day and/or a customary time of day, even if the customer's behavior does not indicate the customer is shopping at a leisurely pace.

Figure 13:
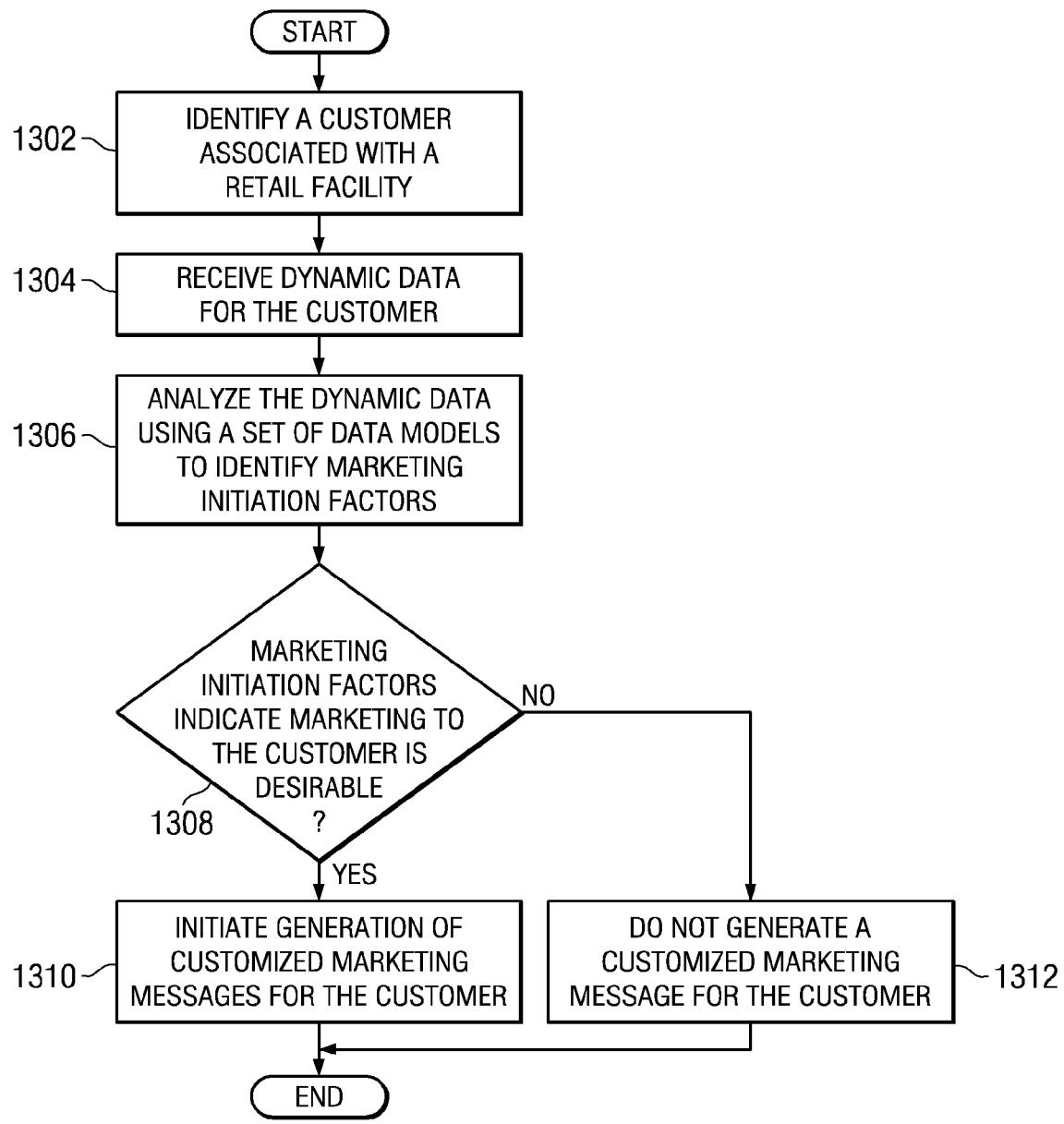
FIG. 13 is a flowchart illustrating a process for making a determination as to whether to provide marketing content to a customer.

FIG. 13 is a flowchart illustrating a process for making a determination as to whether to provide marketing content to a customer. The process is implemented by marketing initiation engine 614 in FIG. 6. The process begins by identifying a customer associated with a retail facility (step 1302). The identification may be an exact identification by a customer's name or address or the identification may be an anonymous identification or an identifier assigned to the customer where the customer's name is unknown.

The process receives dynamic data for the customer (step 1304). The dynamic data is generated in real time as the customer is shopping. The process analyzes the dynamic data using a set of data models to identify marketing initiation factors (step 1306) for the customer. The process makes a determination as to whether marketing to the customer is a desirable customer using the marketing initiation factors (step 1308). As used herein, a desirable customer is a customer that is expected or predicted to generate profits for the retail facility, increase revenues, bring new, valued customers to the retail facility, improve publicity or positive word of mouth advertising for the retail facility, and/or maintain a positive relationship with the retail facility.

Marketing to the customer is desirable if the customer is likely to be receptive to marketing messages. If marketing is desirable, the process initiates generation of customized marketing messages for the customer (step 1310) with the process terminating thereafter. In another embodiment, if the customer is desirable, the process initiates other positive marketing actions, such as, directing store employees to assist the customer, providing desirable marketing offers to the customer, and/or other positive marketing efforts directed towards the customer.

Returning to step 1308, if marketing to the customer is not desirable, the process does not generate marketing messages for the customer (step 1312) with the process terminating thereafter.

Figure 14:
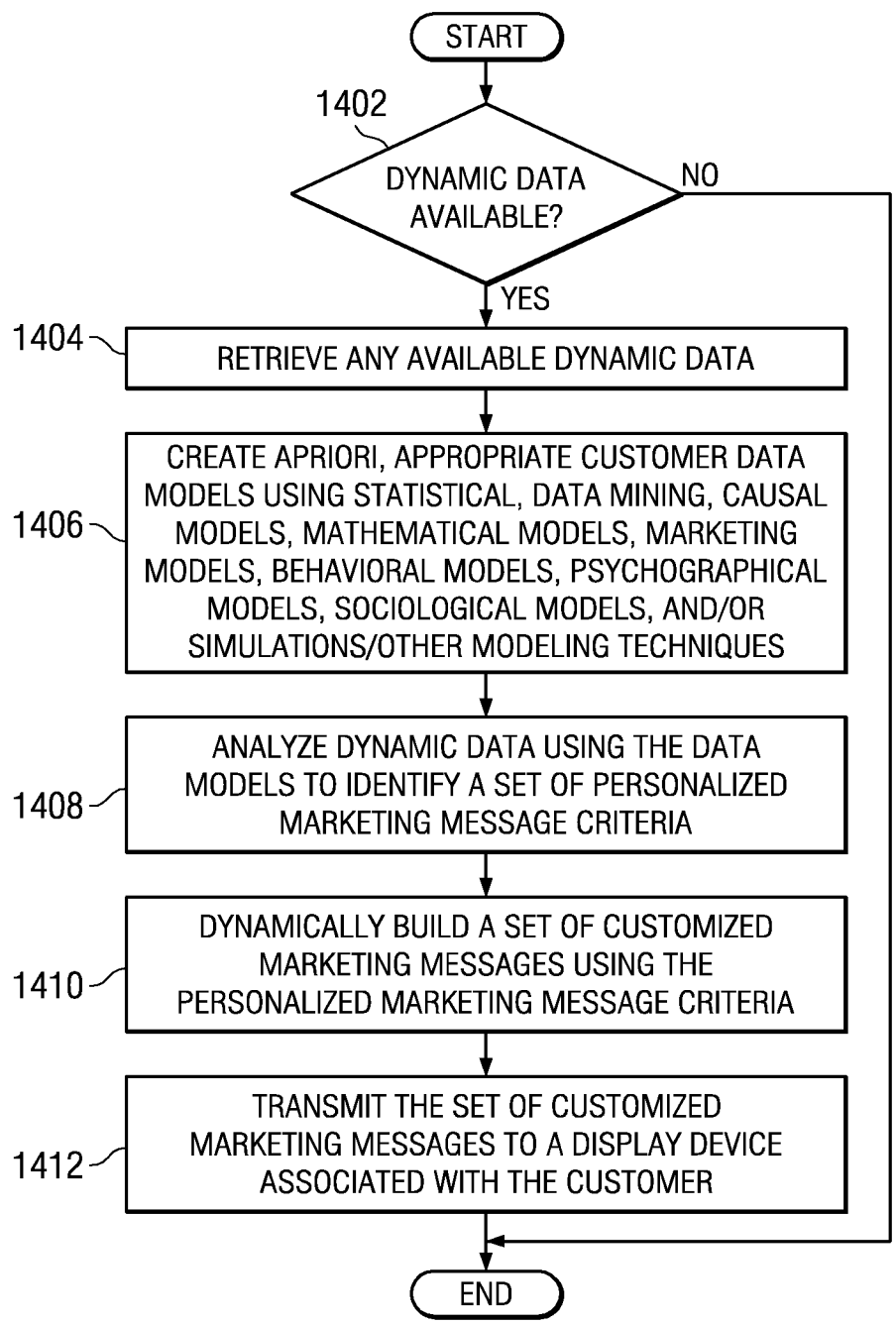
FIG. 14 is a flowchart illustrating a process for generating a customized marketing message using dynamic data in accordance with an illustrative embodiment.

FIG. 14 is a flowchart illustrating a process for generating a customized marketing message using dynamic data in accordance with an illustrative embodiment. The process in FIG. 14 is implemented by a server, such as analysis server 602 in FIG. 6.

The process begins by making a determination as to whether any dynamic data for the customer is available (step 1402). If dynamic data is available, the process retrieves any available dynamic data for the customer (step 1404). The dynamic data includes, without limitation, grouping data, external data, customer identification data, vehicle identification data, customer behavior data, and/or any other dynamic customer data elements.

The process pre-generates or creates in advance, appropriate data models using at least one of a statistical method, data mining method, causal model, mathematical model, marketing model, behavioral model, psychographical model, sociological model, simulations/modeling techniques, and/or any combination of models, data mining, statistical methods, simulations and/or modeling techniques (step 1406). The process analyzes dynamic data using one or more of the appropriate data models to identify a set of personalized marketing message criteria (step 1408). The set of personalized marketing message criteria may include one or more criterion for generating a personalized marketing message. The process dynamically builds a set of one or more customized marketing messages using the personalized marketing message criteria (step 1410). The process transmits the set of customized marketing messages to a display device associated with the customer (step 1412) for presentation of the marketing message to the customer, with the process terminating thereafter.

Thus, the illustrative embodiments provide a computer implemented method, apparatus, and computer program product for automatically determining a marketing status for a customer. The process receives data from a set of detectors associated with a retail facility to form detection data for the customer. The detection data is gathered in real-time as the customer is shopping at the retail facility. The process processes the detection data to form dynamic data for the customer. The process analyzes the dynamic data to identify a set of marketing initiation factors. The marketing initiation factors indicate a degree of receptivity of the customer to marketing messages and/or whether marketing to the customer is desirable. In response to the set of marketing initiation factors indicate initiation of marketing to the customer, the process generates a customized marketing message for the customer. The process dynamically transmits the customized marketing message to a display device associated with the customer. The customized marketing message is displayed to the customer in real-time as the customer is shopping at the retail facility.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk - read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically determining a marketing status for a customer, the computer implemented method comprising:

receiving data from a set of detectors associated with a retail facility to form detection data for the customer, wherein the detection data is gathered in real-time as the customer is shopping at the retail facility;

processing the detection data, by a processor, to identify patterns of events to form current customer behavior data describing events associated with the customer;

retrieving a customer profile for the customer, wherein the customer profile indicates past behavior of the customer while shopping at the retail facility on a different shopping trip;

comparing the current customer behavior data to the past customer behavior data;

responsive to the comparison indicating the customer is walking at a customary pace or shopping at a customary rate, generating positive marketing initiation factors;

responsive to the comparison indicating the customer is walking at a pace that is faster than the customary pace or shopping at a rate that is faster than the customary rate of shopping, generating negative marketing initiation factors;

responsive to generating the positive marketing initiation factors indicating initiation of marketing to the customer, generating a customized marketing message for the customer; and transmitting the customized marketing message to a display device associated with the customer, wherein the customized marketing message is displayed to the customer in real-time as the customer is shopping at the retail facility.

2. A computer program product comprising:

a non-transitory computer readable storage medium storing computer usable program code for automatically determining whether to deliver customized marketing content to a customer associated with a retail facility, the computer usable program code comprising:

computer usable program code for receiving data from a set of detectors associated with a retail facility to form detection data for the customer, wherein the detection data is gathered in real-time as the customer is shopping at the retail facility;

computer usable program code for processing the detection data, by a processor, to identify patterns of events to form current customer behavior data describing events associated with the customer;

computer usable program code for retrieving a customer profile for the customer, wherein the customer profile indicates past behavior of the customer while shopping at the retail facility on a different shopping trip;

computer usable program code for comparing the current customer behavior data to the past customer behavior data;

computer usable program code for generating positive marketing initiation factors in response to the comparison indicating the customer is walking at a customary pace or shopping at a customary rate;

computer usable program code for generating negative marketing initiation factors in response to the comparison indicating the customer is walking at a pace that is faster than the customary pace or shopping at a rate that is faster than the customary rate of shopping;

computer usable program code for generating a customized marketing message for the customer in response to generating the positive marketing initiation factors indicating initiation of marketing to the customer; and computer usable program code for transmitting the customized marketing message to a display device associated with the customer, wherein the customized marketing message is displayed to the customer in real-time as the customer is shopping at the retail facility.

\* \* \* \* \*